United States Patent [19]

Kadono

[11] Patent Number: 5,115,328
[45] Date of Patent: May 19, 1992

[54] BEAM SCAN TYPE RECORDING APPARATUS WITH ELECTRICALLY F THETA CORRECTING FUNCTION

[75] Inventor: Takashi Kadono, Osaka, Japan
[73] Assignee: Minolta Camera Kabushiki Kaisha, Osaka, Japan
[21] Appl. No.: 342,819
[22] Filed: Apr. 25, 1989

[30] Foreign Application Priority Data

| Apr. 25, 1988 | [JP] | Japan | 63-103459 |
| Jul. 6, 1988 | [JP] | Japan | 63-167980 |
| Jul. 6, 1988 | [JP] | Japan | 63-167981 |
| Jul. 6, 1988 | [JP] | Japan | 63-167982 |

[51] Int. Cl.$^5$ .................................. A04N 1/40
[52] U.S. Cl. .................. 358/474; 358/486; 358/480
[58] Field of Search .......... 358/401, 489, 490, 493, 358/495, 296, 298, 480, 481, 474, 448, 452, 486

[56] References Cited

U.S. PATENT DOCUMENTS

| 4,037,231 | 7/1977 | Broyles et al. | 346/108 |
| 4,347,523 | 8/1982 | Ohara | 358/298 |
| 4,717,925 | 1/1988 | Shibata et al. | 346/108 |
| 4,761,660 | 8/1988 | Lee | 358/480 |
| 4,802,105 | 1/1989 | Suzuki | 358/296 |

FOREIGN PATENT DOCUMENTS

| 54-12853 | 1/1979 | Japan . |
| 55-25081 | 2/1980 | Japan . |
| 60-33777 | 2/1985 | Japan . |
| 61-173573 | 8/1986 | Japan . |

Primary Examiner—Jin F. Ng
Assistant Examiner—Jerome Grant, II
Attorney, Agent, or Firm—Burns, Doane, Swecker & Mathis

[57] ABSTRACT

A beam scan type recording apparatus for scanning a laser beam periodically on a photosensitive medium for recording a visible image comprised of dot images is disclosed. In the recording apparatus, numerical data representing time interval between emission timings of the laser beam corresponding to respective dot images are stored in a memory. A dot clock counter outputs a dot clock signal when the counting value thereof agrees with a value preset from the memory, and a laser is driven so as to emit the laser beam according to image data in synchronous with the dot clock signal.

7 Claims, 13 Drawing Sheets

Fig. 15

ROM 51

| Address | Content |
|---|---|
| 000H | fe function correction data for division number 3 |
| 400H | fe function correction data for division number 4 |
| 800H | fe function correction data for division number 5 |
| C00H | fe function correction data for division number 6 |
| FFFH | |

BEAM SCAN TYPE RECORDING APPARATUS WITH ELECTRICALLY F THETA CORRECTING FUNCTION

BACKGROUND OF THE INVENTION

1. Field of the Invention

The present invention relates to a beam scan type recording apparatus such as a laser printer.

2. Description of the Related Art

In a conventional laser printer, a so-called fθ lens is used for scanning a laser beam deflected by a polygon mirror at a uniform speed on a photosensitive medium. However, the fθ lens has such disadvantages that it is expensive.

In order to solve this problem, several apparatuses without the fθ lens have been proposed as follows.

For example, in a beam scan apparatus disclosed in the Japanese patent laid open publication (JP-A) No. 61-173573, the time interval between successive emission timings of the beam is controlled in stead of using the fθ lens. In order for that, the beam scan apparatus comprises a ROM for storing time interval data between emission timings of the beam corresponding to respective exposure points. The time interval data stored in the ROM are converted into an analog voltage signal, and the signal is converted into a frequency signal for driving a laser diode by a voltage to frequency (V/f) converter.

Also, in an apparatus disclosed in the Japanese patent laid open publication (JP-A) No. 55-25081, the above time interval data stored in the ROM are also converted into an analog voltage signal by a digital to analog converter, and frequency-modulated pulses for driving a laser diode are generated by a voltage control type oscillator according to the converted analog voltage signal so as to vary respective time intervals therebetween.

In these apparatuses, since the time interval between successive emission timings of the beam is converted by an analog electric circuit, the time interval therebetween may be changed due to a thermal drift caused in the circuit, resulting in that these apparatuses are not suitable for a practical use.

SUMMARY OF THE INVENTION

An essential object of the present invention is to provide a beam scan type recording apparatus without an optical Fθ function correction means such as an Fθ lens, which is able to control positions of dot images with a lesser temperature dependency than that of the conventional laser printer.

Another object of the present invention is to provide a beam scan type recording apparatus without an optical fθ correction means such as an Fθ lens, which is able to control positions of dot images more precisely than a period of a reference clock signal to be used as a basis of the control.

A further object of the present invention is to provide a beam scan type recording apparatus having an electrical fθ correction means and being free from characteristic variations of used circuitry as to temperature, manufactured lot and the like.

According to one aspect of the present invention, there is provided a beam scan type recording apparatus for deflecting and scanning a laser beam emitted from a laser source periodically with use of a deflecting means so as to form an image on a photosensitive medium for recording a visible image comprised of dot images, comprising: a clock generator for generating a reference clock signal having a predetermined frequency; an address counter for altering the counting value by one in accordance a dot clock signal outputted at a timing for recording one dot image so as to output the counting value as address data; a memory means for storing numerical data representing time interval between emission timings of the laser beam corresponding to respective dot images at each address corresponding thereto so as to output the numerical data stored at the address corresponding to the address data input from said address counter; a dot clock counter being set the numerical data outputted from said memory means as a preset value in response to a load signal, counting the value by one in accordance with the reference clock signal outputted from said clock generator, and outputting the dot clock signal when the counting value agrees with the preset value, the dot clock signal being returned to said dot clock counter as the load signal and being supplied to said address counter to reset it; and a driving means for driving said laser means according to image data in synchronous with the dot clock signal outputted from said dot clock counter; whereby the scan of the laser beam is ensured at a predetermined speed without an optical correction means.

According to another aspect of the present invention, the aforementioned beam scan type recording apparatus further comprises: a delay circuitry arranged between said dot clock counter and said driving means, said delay circuitry comprising a plurality of stages of delay elements connected in series, each delay element having a predetermined delay time shorter than the period of the reference clock signal, each delay element for delaying the dot clock signal outputted from said dot clock counter so as to output delayed dot clock signals having different delay times; and a selection means for selecting the delayed dot clock signals outputted from respective delay elements so as to output the selected dot clock signal to said driving means.

According to a further aspect of the present invention, in the aforementioned beam scan type recording apparatus, said memory means stores a plurality of sets of data, each set of data comprising the numerical data and delay stage data which are different from the delay stage data of the other sets of data at each address; and said beam scan type recording apparatus further comprising: a setting means for setting a set of data to be used.

Accordingly, a suitable set of data can be selected for an actual circuit, resulting in that the positions of dot images can be controlled much more precisely.

According to a still further aspect of the present invention, in the aforementioned beam scan type recording apparatus, said delay elements are constituted by a CMOS device.

Accordingly, the supply voltage to be applied to the CMOS device of said delay elements is adjusted so that the delay time characteristics thereof can be trued up, resulting in that the positions of dot images can be controlled much more precisely.

BRIEF DESCRIPTION OF THE DRAWINGS

These and other objects and features of the present invention will become clear from the following description taken in conjunction with the preferred embodiments thereof with reference to the accompanying drawings, in which:

FIG. 15 shows an address map of a ROM shown in FIG. 16; and

DETAILED DESCRIPTION OF THE PREFERRED EMBODIMENTS THE FIRST PREFERRED EMBODIMENT

A laser printer of the first preferred embodiment according to the present invention will be described below, referring to the attached drawings.

(a) Composition of Scan System of Laser Printer

Figure 1:
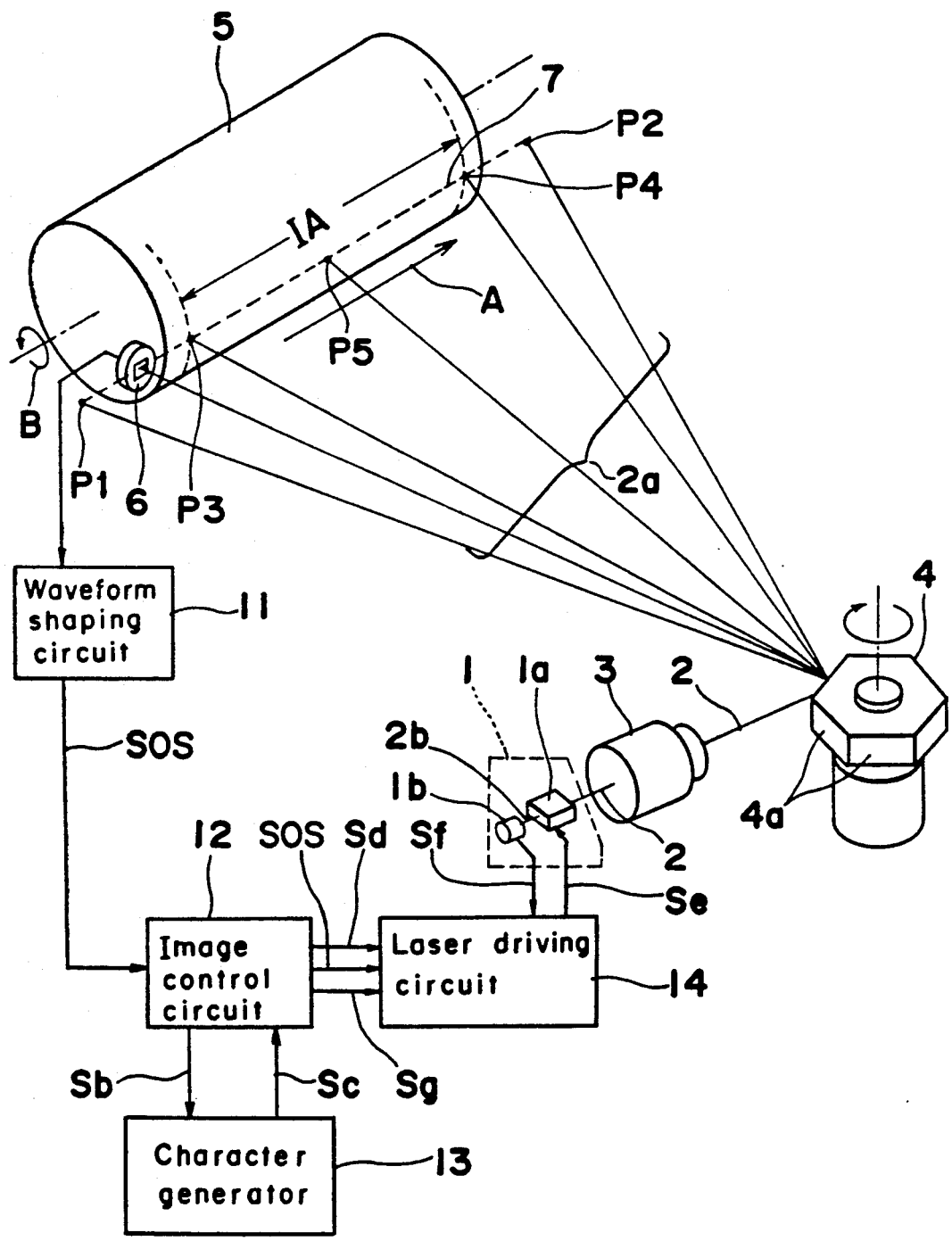
FIG. 1 is a schematic diagram showing a scan system of a laser printer of the first preferred embodiment according to the present invention.

FIG. 1 is a schematic diagram showing a scan system of a laser printer of the first preferred embodiment according to the present invention.

As shown in FIG. 1, a laser light emitted from a semiconductor laser 1a arranged in a laser head 1 is collimated into a parallel beam 2 by a collimator lens 3, and the pencil beam 2 is reflected by a reflecting surface 4a of a polygon mirror 4 rotating about the center axis thereof at a predetermined constant angular velocity. Then, the laser beam 2a having been reflected is projected on a surface of a rotating photoconductor drum 5 so as to scan the surface in a direction parallel to the axis of the drum in accordance with the rotation of the polygon mirror 4. As is well known to those skilled in the art, the photoconductive surface layer of the drum 5 is electrified uniformly by a charger (not shown), and when scanned by the laser beam 2a, an electrostatic latent image is formed thereon.

Then, the incident angle of the laser beam 2 to one of reflecting surface of the polygon mirror 4 varies according to the rotation of the polygon mirror 4, which is one example of a rotation type light deflector, and therefore, the laser beam 2 is deflected so that the reflected laser beam 2a is scanned from a start position P1 to an end position P2 along a line 7 on the surface of the photoconductor drum 5 (referred to as a main scan direction hereinafter) in a direction parallel to the axis thereof as indicated by an arrow A in FIG. 1. On the other hand, the photoconductor drum 5 is rotated about the axis thereof in a direction indicated by an arrow B (referred to as a subscan direction hereinafter) at a predetermined angular velocity in synchronous with the rotation of the polygon mirror 4. When the laser diode 1a is driven according to image data, and therefore, the aforementioned scan operation of the laser beam 2a is performed repeatedly with the rotation of the photoconductor drum 5, an electrostatic latent image is formed on the surface of the photoconductor drum 5.

After the electrostatic latent image is developed in a visible toner image, the toner image is transferred onto a blank paper, and the transferred toner image is fixed by heating, resulting in that the image corresponding to the image data can be printed on the paper.

A photosensor 6 is arranged at a position between the start position P1 of scan of the laser beam 2 and one end of the photoconductor drum 5 so as to detect the reflected laser beam 2a immediately after the start of scan thereof. As soon as the scan by the laser beam 2a reflected by the polygon mirror 4 is started according to the rotation of the polygon mirror 4, the photosensor 6 detects the reflected laser beam 2 so as to output a light current to a waveform shaping circuit 11. The waveform of the outputted light current is shaped by the waveform shaping circuit 11, and the waveform-shaped light current is input as a start of scan signal (referred to as an SOS signal hereinafter) to an image control circuit 12.

In accordance with the SOS signal, the image control circuit 12 outputs a data request signal Sb to a character generator 13 and receives image data Sc therefrom. After a timer provided therein counts a predetermined time interval which is necessary for the laser beam 2a to run from the photosensor 6 to a recording start position P3 on the surface of the photoconductor drum 5, the image control circuit 12 starts to output image data Sd to a laser driving circuit 14. The laser driving circuit 14 starts to output a driving current Se to the semiconductor laser 1a according to the image data Sd.

The SOS signal is used for truing up respective start positions P3 for the electrostatic latent image to be formed by repeatedly scanning the laser beam 2a in synchronous with the rotation of the photoconductor drum 5 so as to prevent any jitter from occurring in the subscan direction. It is to be noted that the SOS signal sent from the waveform shaping circuit 11 is outputted to the laser driving circuit 14 through the image control circuit 12.

On the other hand, in the laser head 1, there is also arranged a photodiode 1b for receiving the laser beam 2b emitted backward from the semiconductor laser 1a in order to monitor the laser beam 2 emitted forward therefrom according to the driving current Se sent from the laser driving circuit 14. In the laser driving circuit 14, a signal Sf outputted from the photodiode 1b is sampled according to a sampling and holding signal Sg sent from the image control circuit 12, and the laser driving circuit 14 controls the driving current Se to be outputted to the semiconductor laser 1a according to the sampled signal of the signal Sf, so as to make the intensity of the laser beam 2 constant in spite of the temperature drift of the semiconductor laser 1a.

(b) Composition of fθ Function Correction Circuit 50

Figure 2:
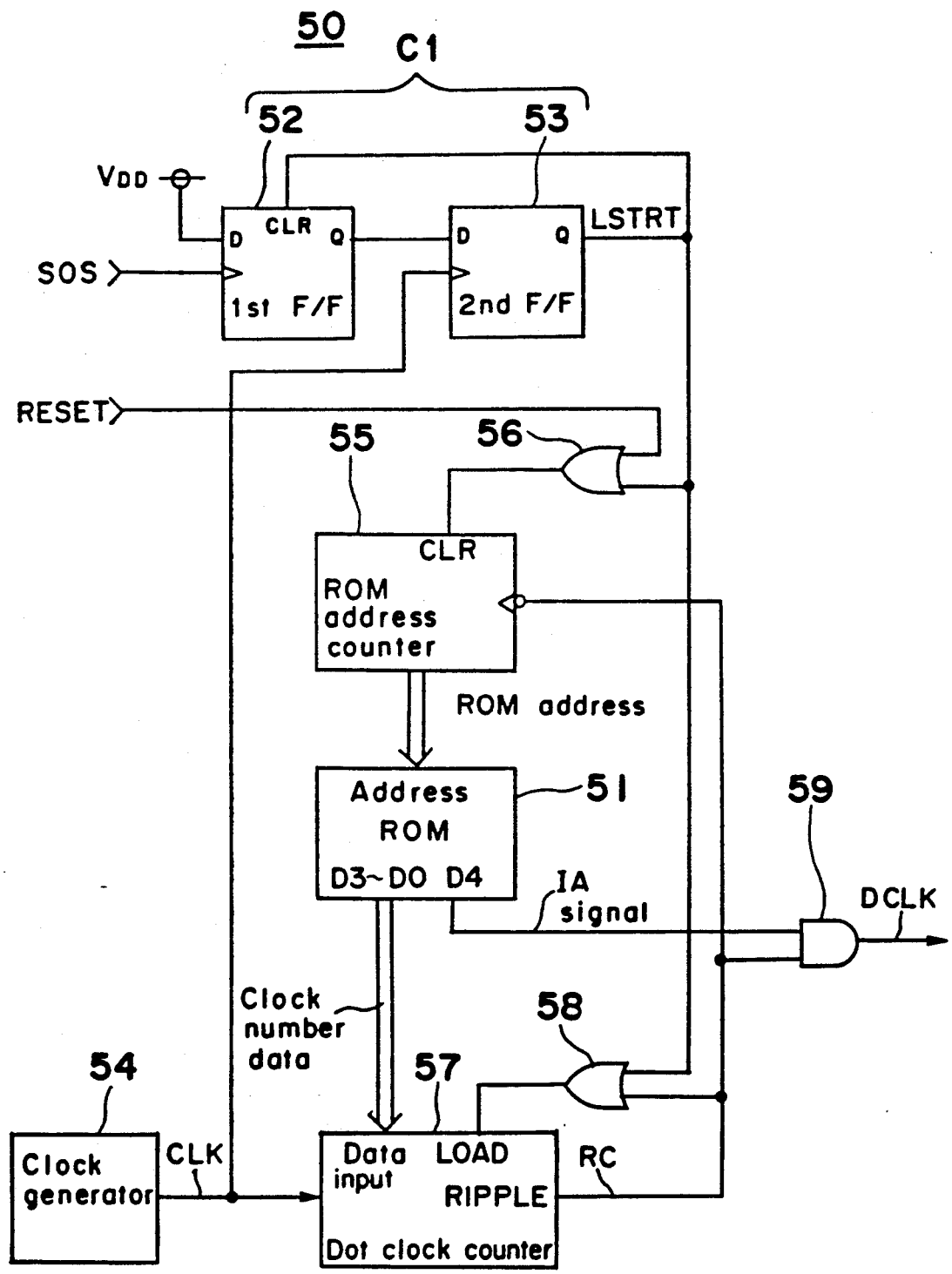
FIG. 2 is a block diagram showing an Fθ function correction circuit shown in FIG. 1.

FIG. 2 is a block diagram showing an Fθ function correction circuit 50 comprised in the laser driving circuit 14 shown in FIG. 1, and in the present preferred embodiment, the Fθ function is electrically obtained without using the conventional Fθ lens. The Fθ function correction circuit 50 generates a dot clock signal DCLK for driving the semiconductor laser 1a according to Fθ function data stored previously in a ROM 51 shown in FIG. 2, in synchronous with a clock signal CLK generated by a clock generator 54.

Table 1 shows one example of the fθ function data stored in the ROM 51. In order to explain the Fθ function data more briefly, the number of the dot clock signals DCLK corresponding to the number of dot images to be formed on one scan line is decreased properly in Table 1. Five bits fθ function data are stored at each address of the ROM 51. The fourth bit D4 of the data is used for generating an IMAGE AREA signal (referred to as an IA signal hereinafter) for representing that the laser beam 2a is scanning on an image area IA defined between the recording start position P3 and the recording end position P4 on the surface of the photoconductor drum 5 as shown in FIG. 1. The third bit D3 to 0-th bit D0 of the data are clock number data for representing the time interval between the adjacent dot clock signals DCLK, in the unit of the number of the clock signals CLK generated within a predetermined time interval.

Each clock number data corresponds to the time interval between emission timings of the laser beam 2. In other words, each clock number corresponds to the difference between two ON timings for turning on the laser beam 2 so as to form two adjacent dot images. The polygon mirror 4 deflects the laser beam 2 at a predetermined angular velocity so as to scan the deflected laser beam 2a on the surface of the photoconductor drum 5. Since each clock number is determined previously so that each interval between two adjacent dot images formed thereon becomes constant, the clock number of the center portion of one scan line 7 in the main scan direction is smaller than the clock number of both of the end portions thereof.

(c) Operation of Fθ Function Correction Circuit 50

In the fθ function correction circuit 50 shown in FIG. 2, a circuit C1 comprised of a first flip flop 52 and a second flip flop 53 generates an LSTRT signal in accordance with the SOS signal sent from the waveform shaping circuit 11 through the image control circuit 12. That is, the first flip flop 52 is set to a High level immediately after it receives the SOS signal as a clock signal. Thereafter, the second flip flop 53 outputs an output signal outputted from the first flip flop 52 in synchronous with the clock signal CLK generated by the clock generator 54. The output signal of the second flip flop 53 becomes a signal for resetting the first flip flop 52, and also becomes the aforementioned LSTRT signal. Therefore, the LSTRT signal is outputted every one scan period.

A ROM address counter 55 generates a ROM address data representing the address of the ROM 51. The aforementioned LSTRT signal is input to a clear terminal CLR of the ROM address counter 55 through an OR gate 56 so as to reset the ROM address counter 55. Therefore, the address of the ROM 51 is returned to "0" when the LSTRT signal is generated in accordance with the SOS signal. It is to be noted that, in the case of a head line of a page, a RESET signal is input to the ROM address counter 55 through the OR gate 56 before printing, and then, the address of the ROM 51 becomes "0".

At that time, the ROM 51 outputs the clock number data stored at the address "0" to a dot clock counter 57. At the same time, the aforementioned LSTRT signal is input to a LOAD terminal of the dot clock counter 57 through an OR gate 58, and the above clock number data is preset as an initial value in the dot clock counter 57. The counting value of the dot clock counter 57 is decreased by one every time the clock signal CLK generated by the clock generator 54 is input thereto. When the counting value thereof becomes "0", the dot clock counter 57 generates a ripple carry output signal RC. The ripple carry output signal RC is outputted as the dot clock signal DCLK to the semiconductor laser 1a through an AND gate 59, when the IA signal is outputted from the ROM 51. Then, the semiconductor laser 1a is driven according to the dot clock signal DCLK. It is to be noted that, at the address "0" of the ROM 51, the semiconductor laser 1a is not driven, because the IA signal is not outputted to the AND gate 59.

The ripple carry output signal RC is also sent as a clock signal to the ROM address counter 55 so as to increase the address of the ROM 51 by one, resulting in that the address of the ROM 51 becomes "1". The ripple carry output signal RC is further sent to the LOAD terminal of the dot clock counter 57 through the OR gate 58, resulting in that the clock number data stored at the address "1" of the ROM 51 are preset in the dot clock counter 57.

Similarly, every time the dot clock counter 57 receives the same number of clock signals CLK as the clock number preset therein, the counter 57 generates the ripple carry output signal RC, and when the IA signal is generated by the ROM 51, i.e., the laser beam 2a is scanned onto the image area of the surface of the photoconductor drum 5, the dot clock signal DCLK is outputted. The dot clock signal DCLK is used as a timing signal for outputting the image data sent from the character generator 13 so as to drive the semiconductor laser 1a.

Figure 3:
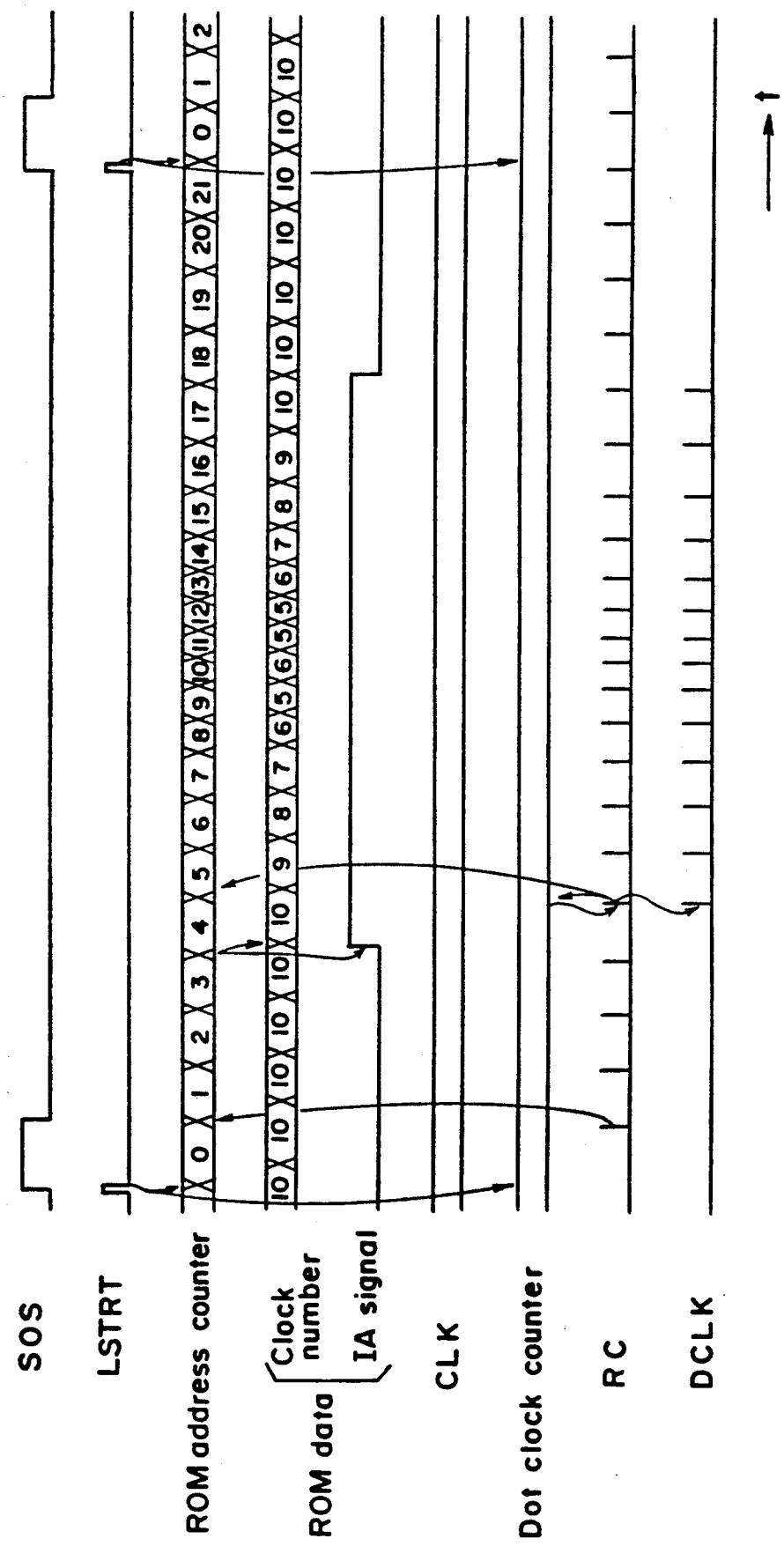
FIG. 3 is a timing chart showing an operation of the Fθ function correction circuit shown in FIG. 2.

FIG. 3 is a timing chart showing one example of the operation of the fθ function correction circuit 50 while the laser beam 2a is scanned from the start position P1 to the end position P2 of one scan line 7 on the surface of the photoconductor drum 5.

As shown in FIG. 3, when the SOS signal is received, the LSTRT signal is generated, and the address of the ROM 51 is returned to "0". Then, the clock number data "5" stored at the address "0" of the ROM 51 are preset in the ROM address counter 55. When the same number of clock signals CLK as the above preset clock number "5" are received, the ripple carry output signal RC is generated.

The address of the ROM 51 is renewed in accordance with the ripple carry output signal RC so as to be altered from "0" to "1", and the clock number data "5" stored at the next address "1" of the ROM 51 is preset in the dot clock counter 57. Thereafter, when the dot clock counter 57 receives the same number of clock signals CLK as the preset clock number "5", it generates the ripple carry output signal RC again.

Similarly, every time the ripple carry output signal RC is generated sequentially, the address of the ROM 51 input from the ROM address counter 55 is renewed, and the clock number data stored at the renewed address of the ROM 51 are preset in the dot clock counter 57. Thereafter, when the ripple carry output signal RC is generated while the laser beam 2a is scanned on the image area IA, i.e., the address of the ROM 51 is in the range from "5" to "17" in the present preferred embodiment, the dot clock signal DCLK is outputted to the semiconductor laser 1a so as to drive it. As described above, the clock number data corresponding to the time interval between the emission timings of the semiconductor laser 1a is predetermined so that the time interval at both of the end portion of one scan line 7 is smaller than that at the center portion thereof, resulting in that the fθ function can be corrected electrically as well as the optical correction of the Fθ function with the conventional fθ lens.

Figure 4:
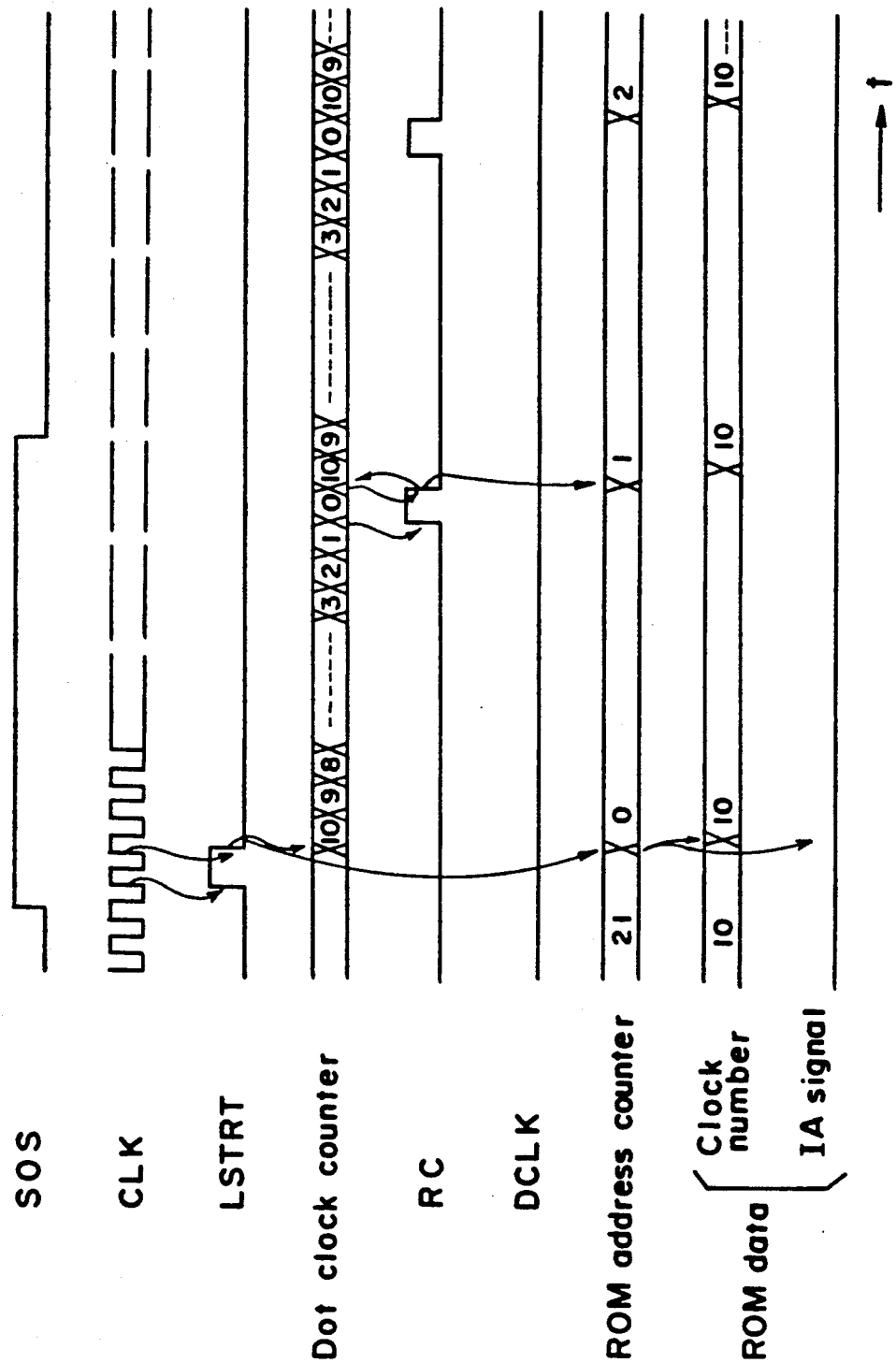
FIGS. 4 and 5 are enlarged timing charts showing parts of the timing chart shown in FIG. 3.
Figure 5:
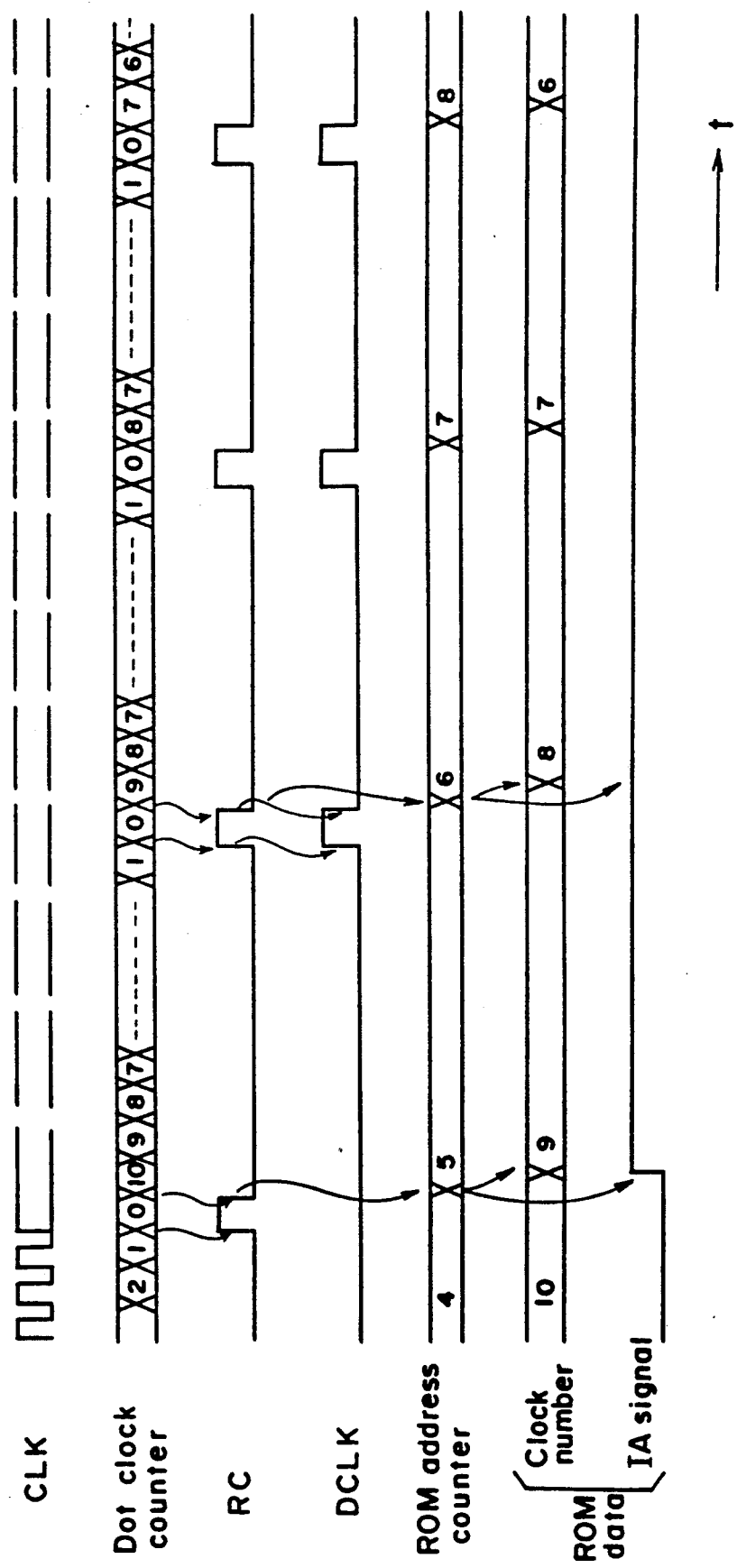

FIGS. 4 and 5 show the details of each one portion of the timing chart shown in FIG. 3.

Referring to FIG. 4, when the SOS signal is input thereto, the LSTRT signal is generated, the ROM address counter 55 is reset, and the clock number data outputted from the ROM 51 are loaded in the dot clock counter 57. At that time, in the case of a head line of a page, the address outputted from the ROM address counter 55 is reset to "0" previously in accordance with the RESET signal input before printing, on the other hand, in the cases other than a head line of a page, the address thereof becomes the final address in the processing for the previous line ("24" as shown in FIG. 4). Due to this, it is necessary to set the same data stored at the final address in the processing for each scan line 7 as the data stored at the address "0".

When the LSTRT signal becomes inactive, the dot clock counter 57 counts down the counting value by one in accordance with the clock signal CLK, and thereafter, when the counting value of the dot clock counter 57 becomes "0", the ripple carry output signal RC is outputted.

When the ripple carry output signal RC is outputted, the counting value of the ROM address counter 55 is increased by one, and the clock number data which have been outputted by then are loaded in the dot clock counter 57, and then, the same operation as the above is performed again.

The above operation is performed repeatedly, and when the IA signal outputted from the ROM 51 becomes active after the address outputted from the ROM address counter 55 becomes "4" as shown in FIG. 5, the dot clock signal DCLK is outputted so as to drive the semiconductor laser 1a every time the ripple carry output signal RC is outputted.

When the address outputted from the ROM address counter 55 is in the range from "4" to "17", the IA signal becomes active, and the dot clock signal DCLK is outputted every time a predetermined clock number of clock signals CLK are generated.

Accordingly, in the laser printer of the present preferred embodiment, since the Fθ function can be electrically corrected by the Fθ function correction circuit 50 constituted by the digital circuits as described above, the temperature dependency thereof can be improved much more than that of the conventional laser printer with an analog fθ correction circuit.

THE SECOND PREFERRED EMBODIMENT

A laser printer of the second preferred embodiment according to the present invention will be described below, referring to the attached drawings.

In the first preferred embodiment, the digital circuits are used for providing fθ characteristics to improve temperature dependency of circuitry. However, operation frequency of digital circuits is at most 50 or 75 MHz which is substantially similar level to the frequency of reference clock (20 MHz) used for the digital circuits, so that dot position controlled according to the first embodiment is slightly deviated from actual dot position. The Fθ function correction circuit of the second preferred embodiment improves such deviations, to thereby provide more precise dot position control.

(a) Composition of Laser Printer

The scan system of the laser printer of the second preferred embodiment has an essentially same composition as that shown in FIG. 1. In the laser printer, the Fθ function is also corrected electrically.

Figure 11:
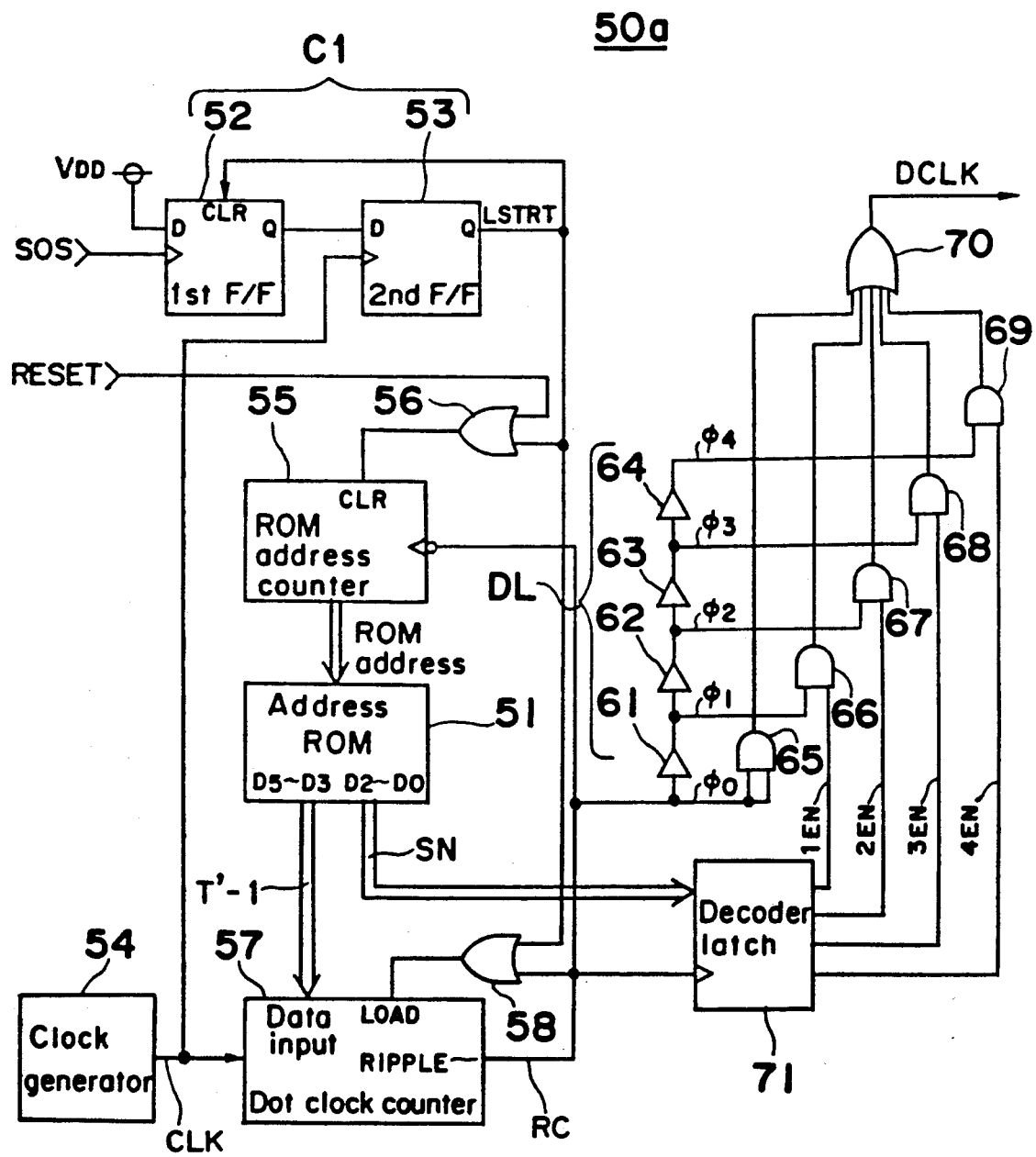
FIG. 11 is a block diagram showing the fθ function correction circuit of the laser printer of the second preferred embodiment.

FIG. 11 shows an Fθ function correction circuit 50a comprised in the laser driving circuit 14 shown in FIG. 1. In FIG. 11, the same components as those shown in FIG. 2 are designated by the same numerals as those shown in FIG. 2. The fθ function correction circuit 50a shown in FIG. 11 comprises a delay circuit DL comprised of four stages of delay elements 61 to 64, five AND gates 65 to 69, an OR gate 70, and a decoder latch circuit 71, in addition to the fθ function correction circuit 50 shown in FIG. 2. In the fθ function correction circuit 50a, a timing signal for driving the semiconductor laser 1a is generated according to Fθ function data stored in the ROM 51, wherein the data stored in the ROM 51 of the second preferred embodiment are different from those of the first preferred embodiment. The operation of the fθ function correction circuit 50a will be described later in detail.

(b) fθ Function Data

First of all, the fθ function data stored in the ROM 51 will be described below.

Figure 6:
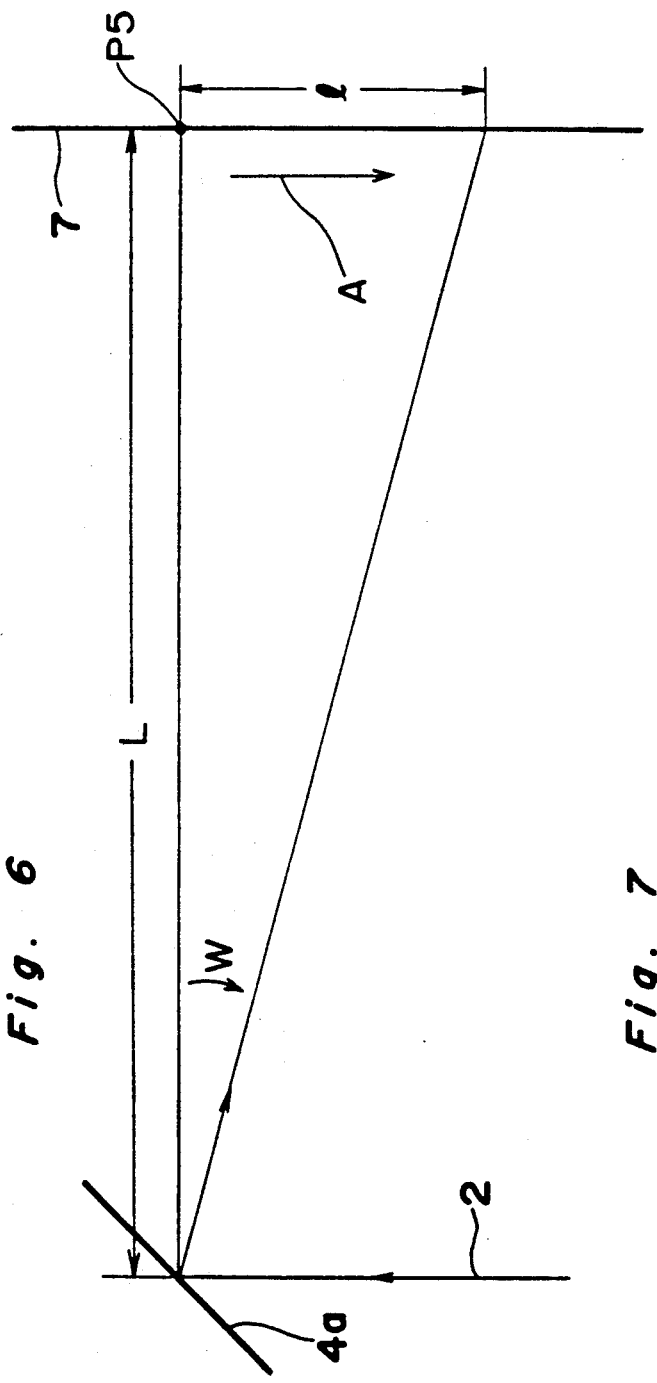
FIG. 6 is a schematic diagram showing the relationship between a laser beam and a scan position in a laser printer of the second preferred embodiment according to the present invention.

Now, assuming that the scan time t is timed so as to become zero when the laser beam 2a passes the center point P5 of the scan line 7 as shown in FIG. 1, the scan position l of the laser beam 2a can be expressed by the following equation (1) as shown in FIG. 6, referring to a reference point l=0 corresponding to the center point P5 thereof.

$$l = L \tan(wt), \quad (1)$$

wherein w is an angular velocity of the laser beam 2a, i.e., w/2 is an angular velocity of the polygon mirror 4, and L is an optical path length between the incident position of the laser beam 2 on the reflecting surface 4a of the polygon mirror 4 and the center point P5 of the scan line 7 in the main scan direction on the surface of the photoconductor drum 5.

On the assumption that the rotation number of the polygon mirror 4 is 5,000 rpm, the optical path length L is 300 mm, and the frequency of the clock signal CLK is 20 MHz, the angular velocity w and the scan position l at a scan time expressed by the number T of the clock signals CLK which is counted from the center point P5 are given by the following equations:

$$l = 300 \times \tan(wt) \quad (2)$$

$$w = 2 \times 2\pi \times 5000 \text{ rpm}/60 \text{ sec}/20 \text{ MHz} \times T \quad (3)$$

$$= 5.236 \times 10^{-5} T$$

Figure 7:
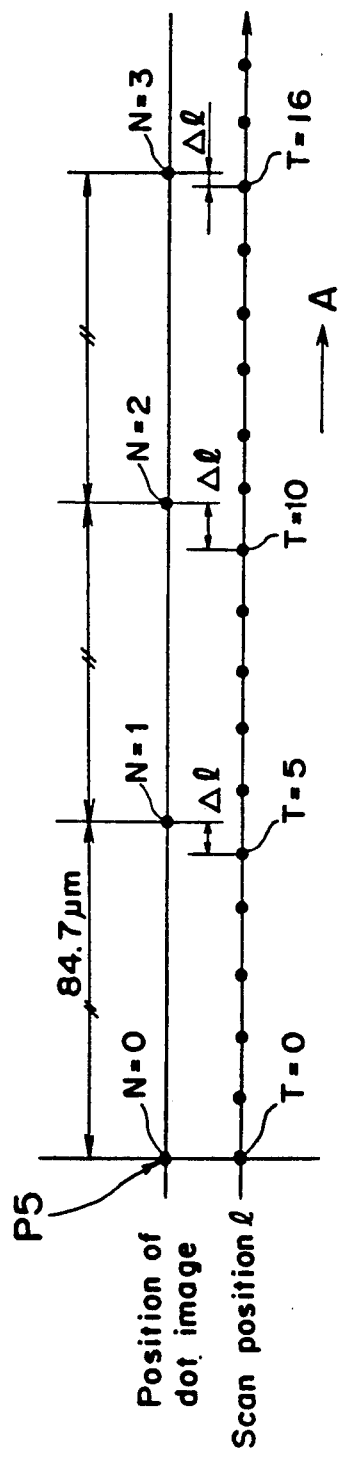
FIG. 7 is a schematic diagram showing the relationship between a position of each dot image to be printed and a scan position in the laser printer of the second preferred embodiment.

If the dot density of the laser printer is 300 dpi, the distance between the adjacent dot images becomes $25.4/300 \text{ mm} = 84.7 \mu\text{m}$. In FIG. 7, the position N of each of dot images successive to the center point P5 (N=0), and the clock signals CLK are plotted in the main scan direction A, respectively. In the present preferred embodiment, the f$\theta$ function data to be stored in the ROM 51 are represented using difference clock numbers T', each of which is given by a difference between successive two clock numbers representing respective clock signals to be generated just before respective timings of the dot images. For example, between the first and second dot images (N=1 and N=2), the difference clock number T' becomes "5" since the clock numbers T are given by "5" and "10", respectively. As mentioned above, real position of each of dot images is designated by the clock number T not by the position number N of respective dot images. As is easily understood from the relation between two numbers T and N shown in FIG. 7, each clock number T is chosen as the maximum integer which satisfy the following inequality in regard to a given position number N.

$$84.7 \times N \geq 300 \tan(5.236 \times 10^{-5} T) \quad (4)$$

Table 2 shows the scan position l corresponding to each clock number N and the positions of the dot images, and Table 3 shows the selected clock number T according to the above method, the distance l between the positions of the selected clock number T and the center point P5 of the scan line 7, and the difference $\Delta l$ between the position of the selected clock number T and the position of the next dot image.

Figure 8:
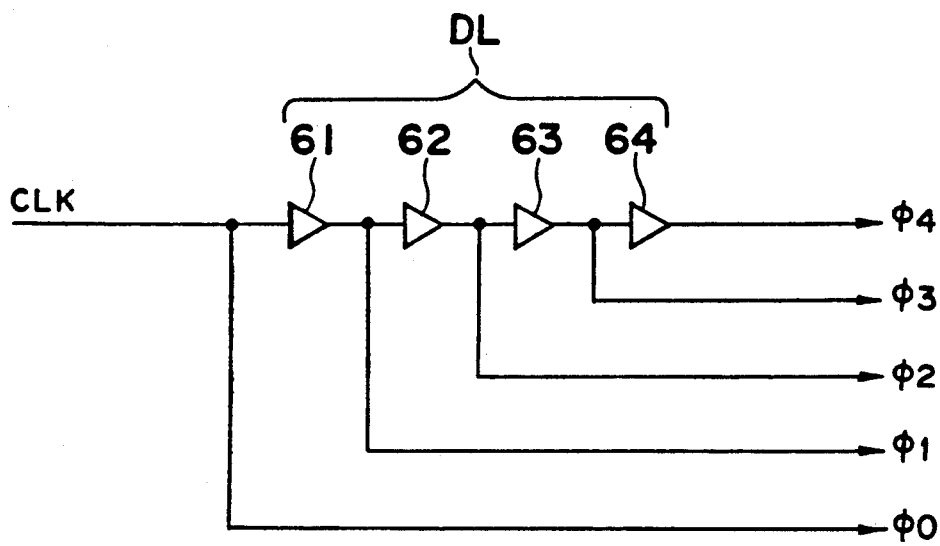
FIG. 8 is a principal circuit diagram showing a delay circuit for generating delayed clock signals in the laser printer of the second preferred embodiment.
Figure 9:
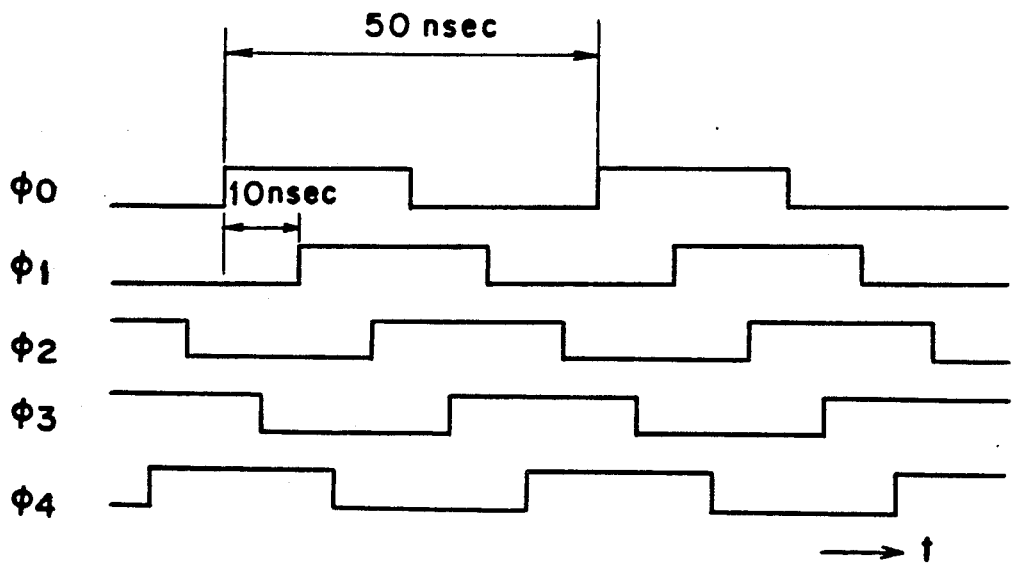
FIG. 9 is a timing chart showing an operation of the delay circuit shown in FIG. 8.

FIG. 8 shows a principal composition of a delay circuit DL used in the present preferred embodiment. In FIG. 8, the delay circuit DL is comprised of four stages of delay elements 61 to 64 connected in series, wherein the reference clock signal CLK is input to an input terminal of the first stage of delay element 61, the reference clock signal CLK is outputted directly as a clock signal $\phi 0$, and respective delayed clock signals $\phi 1$ to $\phi 4$ are outputted from respective output terminals of the delay elements 61 to 64, respectively. When the frequency of the reference clock signal CLK is 20 MHz (the period thereof is 50 nsec) and the delay time of each delay element 61 to 64 is 10 nsec, the substantial clock frequency for defining the dot images becomes five times as high as the frequency of the clock signal CLK as shown in FIG. 9.

Accordingly, when the maximum clock number T which is selected so that the selected scan position is not positioned beyond the next dot image and the number SN of delay stages are designated, the scan position l can be expressed by the following equation (5):

$$l = 300 \tan\{w \times (T+t)/5\} \quad (5)$$

Table 4 shows the maximum clock number T selected so described above, the clock number T' of the differences between the adjacent selected maximum clock numbers T, the number SN of delay stages, and the difference $\Delta l$ between the scan position of the selected maximum clock number T and the position of the next dot image. As shown in Table 4, the maximum value of the differences $\Delta l$ becomes about delay time of each delay element 61 to 64, i.e., smaller than about 3.6%. That is, the variations of the differences $\Delta l$ between the scan timings and the position of the dot images are reduced to about 1/5 of that in the case of the laser printer without the delay circuit DL, and the correction of the F$\theta$ function can be improved considerably.

74HC00 type CMOS IC is preferably used as the delay elements 61 to 64, which is relatively cheap and is capable to operate at a high speed. The transferring delay characteristics of the IC vary generally according to the quality of manufactured lot, the operating temperature, and the operating voltage etc., however, in the case that the delay elements contained within the same package are used, the respective delay elements thereof have the approximately same transferring delay characteristics. Accordingly, the delay elements contained within the same package are preferably used.

Table 5 shows the clock number data T'-1 and the number data SN of the delay stage selectively stored at each address of the ROM 51. As shown in Table 5, the clock number data T'-1 is stored at the fifth bit D5 to the third bit D3 of each address of the ROM 51, and the number data SN of the delay stage is stored at the second bit D2 to the 0-th bit D0 of each address thereof. In the f$\theta$ function correction circuit 50a, the clock number data T'-1 stored in the ROM 51 is smaller than the clock number data T shown in Table 4 by one, because the dot clock counter 57 counts the value one larger than the number data preset therein. Furthermore, in the f$\theta$ function correction circuit 50a, the number data SN of the delay stage corresponding to the clock number data T'-1 is stored at the next address of the ROM 51 taking into consideration of the timing for inputting the data SN to the decoder latch circuit 71.

It is to be noted that, in the present preferred embodiment, the clock number T and the number SN of the delay stage are selected so that the selected scan position is not positioned beyond the position of the dot image, respectively, however, a proper method for selecting the clock number T and the number SN of the delay stage can be used according to the quality of image formed on the surface of the photoconductor drum 5. For example, in an altered embodiment, the clock number T(N) may be selected so that the selected scan position is positioned at the nearest to the N-th dot image, i.e., so that the absolute value $|\Delta l|$ of the differences between the selected scan position and the position of the nearest dot image thereto which is expressed $$\Delta l = N \times 25.4 / 300 \times 300 \times w \times T(N) \quad (6)$$

Table 6 shows the clock number T(N) selected according to the above method, the clock number T'(N) of the difference between the adjacent clock number T(N), the dot interval between the dot images, and the difference $\Delta l$ between the scan position and the nearest dot image thereto. In the altered embodiment, the difference $\Delta l$ between the scan position and the position of the nearest dot image thereto becomes either positive value or negative value corresponding to that the selected scan position is positioned nearer to the center position P5 rather than the dot image, or the selected scan position is positioned farther from the center position P5 rather than the dot image. The clock number data T'(N)=T(N)−T(N-1) obtained according to the aforementioned method are stored in the ROM 51.

When the substantial clock frequency for defining the dot images becomes five times as high as the frequency of the reference clock signal CLK by using the delay circuit DL comprised of the four delay elements 61 to 64 having a delay time of 10 nsec respectively, as shown in FIG. 8, the clock number T(N) counted from the center point P5 which is nearest to the N-th dot image from the center point P5 and the number SN(N) of the delay stage at the N-th dot image are calculated as shown in Table 7. Then, the difference Δl between the scan position of the clock number T(N) and the position of the N-th dot image is expressed by the following equation (7).

$$\Delta l = N \times 25.4 / 300 - 300 \tan[w \times (T(N) + (10/50) SN(N))] \quad (7)$$

As is apparent from Table 7, the errors between the selected scan position and the position of the nearest dot image thereto are within the range of approximately ±1.9%.

Furthermore, Tables 8 and 9 show the clock number T(N) and the number SN(N) of the delay stage corresponding thereto with use of delay circuits comprised of delay elements having delay times of 7 nsec and 13 nsec, respectively. In these cases, the substantial clock frequencies for defining the dot images become seven times and four times as high as the frequency of the clock signal CLK respectively, and the errors between the selected scan position and the position of the nearest dot image thereto are within the range of approximately ±1.3% and ±2.4%. It is to be noted that the numbers of the delay elements required for constructing the above delay circuits in those cases become seven and four, respectively.

(c) Fθ Function Correction Circuit 50a

The Fθ function correction circuit 50a comprising the ROM 51 for storing the data shown in Table 5 will be described below in detail.

Referring to FIG. 11, the circuit C1 comprised of the first and second flip flops 52 and 53 generates the LSTRI signal in accordance with the SOS signal sent from the waveform shaping circuit 11 through the image control circuit 12, as well as the circuit 50 shown in FIG. 2.

The ROM address counter 55 generates the ROM address so as to output it to the ROM 51. The aforementioned LSTRT signal is input to the clear terminal CLR of the ROM address counter 55 through the OR gate 56 so as to reset the ROM address counter 55. Then, the address of the ROM 51 is returned to "0" in accordance with the SOS signal. It is to be noted that, in the case of a head line of a page, the RESET signal is input to the clear terminal CLR of the ROM address counter 55 through the OR gate 56 before printing so that the ROM address outputted therefrom becomes "0".

Then, the ROM 51 outputs the clock number data T'-1 stored at the address "0" thereof to the dot clock counter 57. At the same time, the aforementioned LSTRT signal is sent to the LOAD terminal of the dot clock counter 57 through the OR gate 58, so that the above clock number data T'-1 are preset as an initial value in the dot clock counter 57. The counting value of the dot clock counter 57 is decreased by one every time the clock signal CLK generated by the clock generator 54 is input thereto. When the counting value thereof becomes "0", the dot clock counter 57 generates the ripple carry output signal RC. The ripple carry output signal RC has a pulse width, for example, which is equal to the period (50 nsec) of the clock signal CLK, and the ripple carry output signal RC is outputted to the delay circuit DL comprised of four stages of delay elements 61 to 64 connected in series.

The ripple carry output signal RC is also sent as a clock signal to the ROM address counter 55 so as to increase the ROM address by one, resulting in that the ROM address becomes "1". The ripple carry output signal RC is further sent to the LOAD terminal of the dot clock counter 57 through the OR gate 58, resulting in that the clock number data T stored at the address "1" of the ROM 51 are preset in the dot clock counter 57. Similarly, the ripple carry output signal RC is generated every time the dot clock counter 57 receives the same number of clock signals CLK as the clock number preset therein.

The delay circuit DL is comprised of four stages of delay elements 61 to 64 connected in series. The ripple carry output signal RC or φ0 is input to the input terminal of the first stage of delay element 51, and then, four kinds of delayed clock signals φ1 to φ4 are generated. The ripple carry output signal RC is input to both of input terminals of an AND gate 65, and the delayed clock signals φ1 to φ4 are input to the first input terminals of AND gates 66 to 69, respectively. When the AND gate 66 to 69 are opened, the delayed clock signals φ1 to φ4 are sent to input terminals of an OR gate 70, respectively. The ripple carry output signal RC is always sent to an input terminal of the OR gate 70 through the AND gate 65, because the signal RC is input to both of the input terminals of the AND gate 65.

On the other hand, the number data SN of the delay stage outputted from the ROM 51 are sent to the decoder latch circuit 71, and are latched at a timing slightly delayed from the trailing edge of the ripple carry output signal RC. Then, the number data SN of the delay stage are decoded to 4 bit data 1EN, 2EN, 3EN and 4EN representing the delay stage to be selected by the decoder latch circuit 71, and the 4 bit data 1EN, 2EN, 3EN and 4EN are sent to the second input terminals of the AND gates 66 to 69, respectively. Accordingly, only one enabled AND gates 66, 67, 68 or 69 outputs the delayed clock signal φ1, φ2, φ3 or φ4 to the OR gate 70. Thus, the leading edge of the dot clock signal DCLK outputted from the OR gate 70 is synchronized with the leading edge of the ripple carry output signal φ0 or RC, and the trailing edge of the dot clock signal DCLK is synchronized with the trailing edge of the selected delayed clock signal (either φ1, φ2, φ3 or φ4). Then, the semiconductor laser 1a is driven so as to be emitted in accordance with the trailing edge of the dot clock signal DCLK. Accordingly, if the delay characteristics of the delay elements 61 to 64 are the approximately same, a proper Fθ function can be obtained except for a small error shown in Table 4.

It is to be noted that the practical delay times of the ripple carry output signal φ0 or RC and the delayed clock signals φ1 to φ4 are influenced by the variations of the transferring delay times of respective AND gates 65 to 69, therefore, the AND gates 65 to 69 contained within the same package are preferably used so as to reduce the variations of the delay times thereof.

Figure 10:
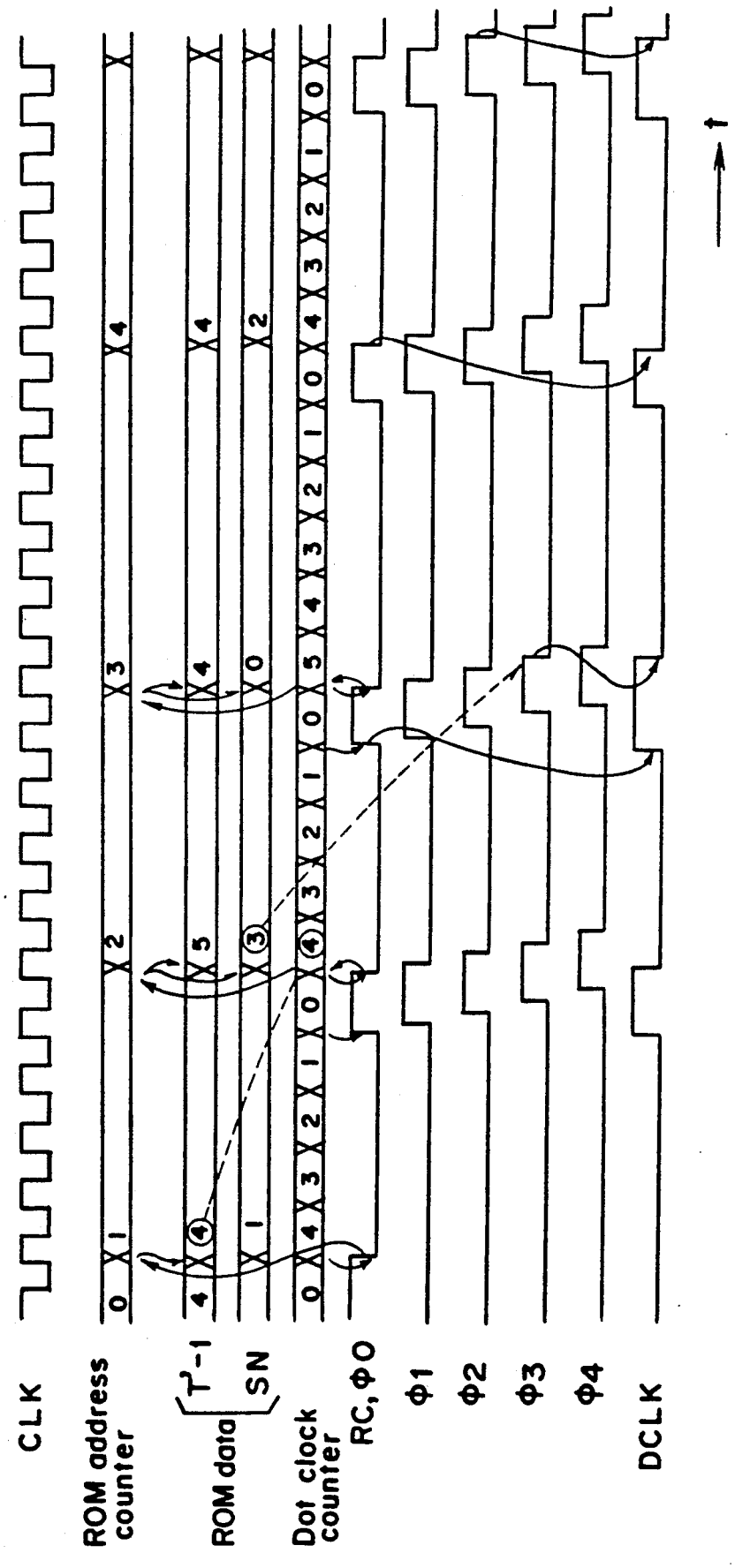
FIG. 10 is a timing chart showing an operation of an fθ function correction circuit of the laser printer of the second preferred embodiment.

FIG. 10 is a timing chart showing an operation of the Fθ function correction circuit 50a performed from a timing when the laser beam 2a is scanned on the center point P5 of the scan line 7 on the surface of the photoconductor drum 5. For convenience, the address outputted from the ROM address counter 55 is set to "0" when the laser beam 2a is scanned on the above center point P5.

In the case that the counting value of the ROM address counter 55 is "0", when the dot clock counter 57 outputs the ripple carry output signal RC, the counting value thereof is increased by one and is set to "1", and then, the above counting value data "1" are sent as the ROM address to the ROM 51. Then, the ROM 51 outputs the data "4" stored at the address "1" as the clock number data T'-1 to the dot clock counter 57. Thereafter, at the trailing edge of the ripple carry output signal RC outputted at the next time, the clock number "4" is set in the dot clock counter 57. The dot clock counter 57 counts down the counting value in accordance with the clock signal CLK, and when the counting value thereof becomes "0", the dot clock counter 57 generates the ripple carry output signal RC. Thereafter, at the trailing edge of the the ripple carry output signal RC, the counting value of the ROM address counter 55 becomes "2", and the ROM 51 outputs the number data SN="3" of the delay stage stored at the address "2" thereof to the decoder latch circuit 71. Then, the decoder latch circuit 71 latches and decodes the above data SN="3" so as to make the enable signal 1EN active. Therefore, the OR gate 70 outputs the OR signal of the ripple carry output signal RC and the delayed clock signal φ3 as the dot clock signal DCLK. That is, the trailing edge of the dot clock signal DCLK is synchronized with the trailing edge of the ripple carry output signal φ0 or RC. When the semiconductor laser 1a is driven in accordance with the dot clock signal DCLK, the Fθ function is corrected with the errors shown in Table 4.

It is to be noted that, the scan operation performed from a timing when the laser beam 2a is scanned on the center point P5 of the scan line 7 is described above, however, the scan operation from a timing when the laser beam 2a is scanned on the scan start point P1 to a timing when it is scanned on the center point P5 is performed as well as the above scan operation.

While the laser beam 2a is scanned on the image area positioned between the aforementioned points P3 and P4 shown in FIG. 1, the laser driving circuit 14 outputs the timing signal Se for driving the semiconductor laser 1a according to the image data Sd received from the character generator 13 through the image control circuit 12, in accordance with the dot clock signal DCLK outputted from the fθ function correction circuit 50a.

Accordingly, in the laser printer of the second preferred embodiment, the fθ function can be electrically corrected precisely with a reduced deviation between the controlled dot position and the actual dot position as well as with a lesser temperature dependency than that of the conventional laser printer, resulting in that a conventional expensive fθ lens is not required.

THE THIRD PREFERRED EMBODIMENT

A laser printer of the third preferred embodiment according to the present invention will be described below, referring to the attached drawings.

The scan system of the laser printer of the third preferred embodiment has an essentially same composition as that shown in FIG. 1. In the laser printer, the fθ function is also corrected electrically.

Figure 14:
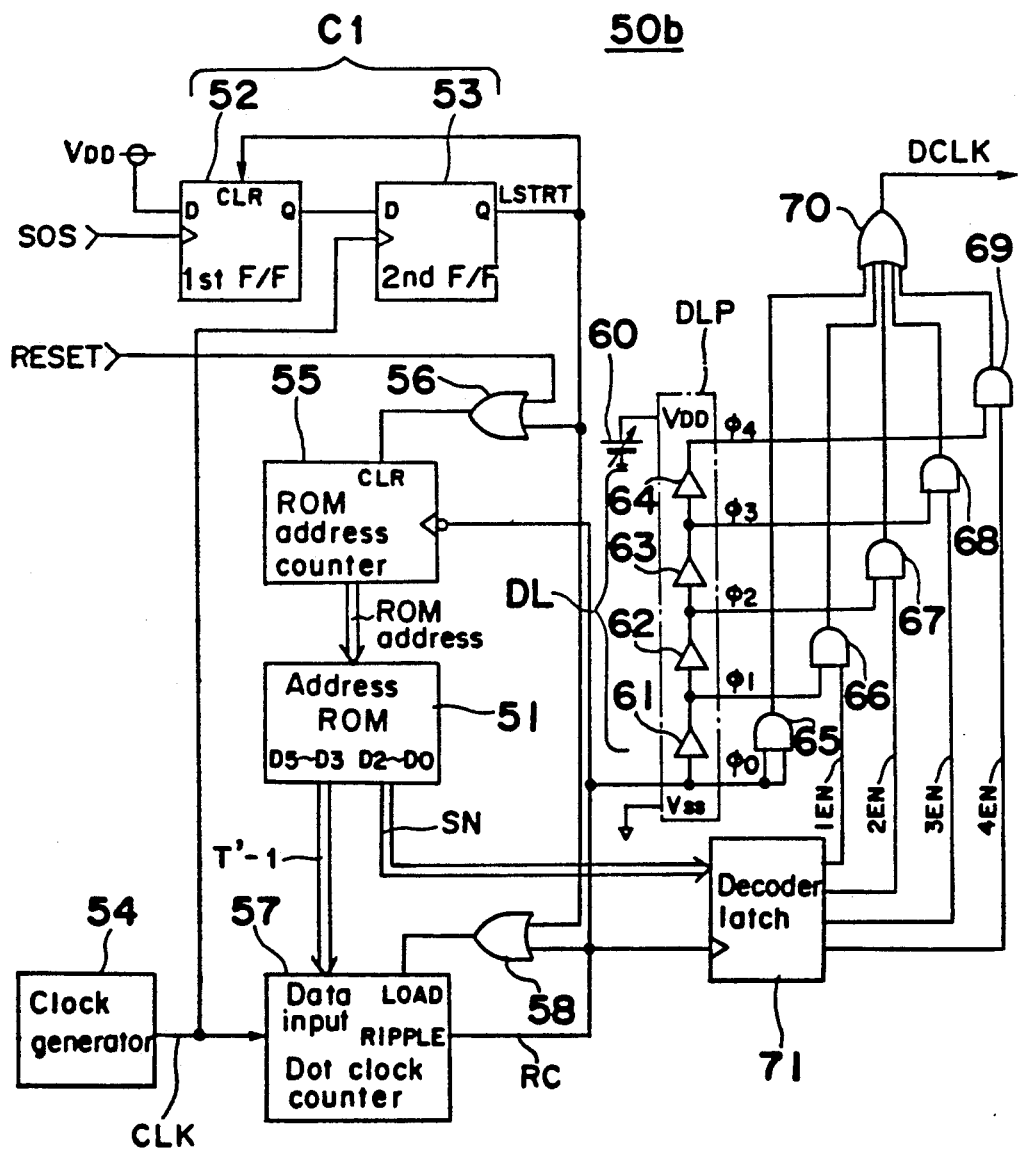
FIG. 14 is a block diagram showing an Fθ function correction circuit of the laser printer of the third preferred embodiment.

FIG. 14 shows an fθ function correction circuit 50b comprised in the laser driving circuit 14 shown in FIG. 1. In FIG. 14, the same components as those shown in FIGS. 2 and 11 are designated by the same numerals as those shown in FIGS. 2 and 14. The fθ function correction circuit 50b shown in FIG. 14 is characterized in that the delay elements 61 to 64 of the delay circuit DL are contained within the same IC package DLP and the power for the delay elements 61 to 64 is supplied by a variable voltage source 60, in addition to the Fθ function correction circuit 50a shown in FIG. 11. It is to be noted that the data stored in the ROM 51 are the same as that stored in the ROM 51 of the second preferred embodiment.

The differences between the third and second preferred embodiments will be mainly described hereinafter.

Figure 12:
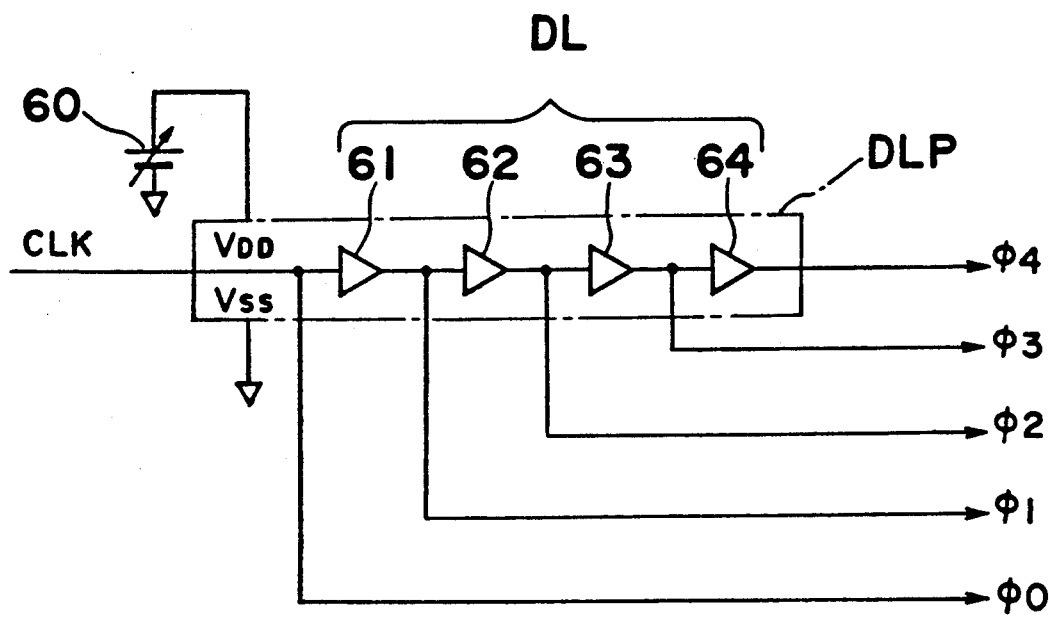
FIG. 12 is a principal circuit diagram showing a delay circuit for generating delayed clock signals in a laser printer of the third preferred embodiment according to the present invention.

FIG. 12 is a principal circuit diagram of the delay circuit DL of the third preferred embodiment.

Referring to FIG. 12, the delay circuit DL is comprised of four stages of delay elements 61 to 64 connected in series, and the delay elements 61 to 64 are contained within the same IC package DLP, preferably of 74HC00 type CMOS IC. A power supply terminal $V_{DD}$ of the IC is connected to the variable voltage source 60 for supplying a variable direct-current voltage, and a ground terminal $V_{SS}$ thereof is connected to ground.

The transferring delay characteristic of the IC varies generally according to the manufactured lot, the operating temperature, the operating voltage etc., however, when the elements contained within the same IC package DLP are used, the approximately same characteristics can be obtained.

The specification of the delay characteristic of the CMOS IC is generally specified, however, there are the variations of the delay characteristic in respective manufactured CMOS IC chips.

Table 10 shows the switching characteristics of 74HC00 type CMOS IC, under condition of the atmospheric temperature Ta=25° C. and the supply voltage $V_{DD}$=5 V. As shown in Table 10, for example, the maximum value of the transferring delay time $t_{PLH}$ is 15 nsec, and the typical value thereof is 8 nsec, however, the specification of the minimum value thereof is not specified. Accordingly, there are relatively large variations in the delay characteristic of the above CMOS IC.

Figure 13:
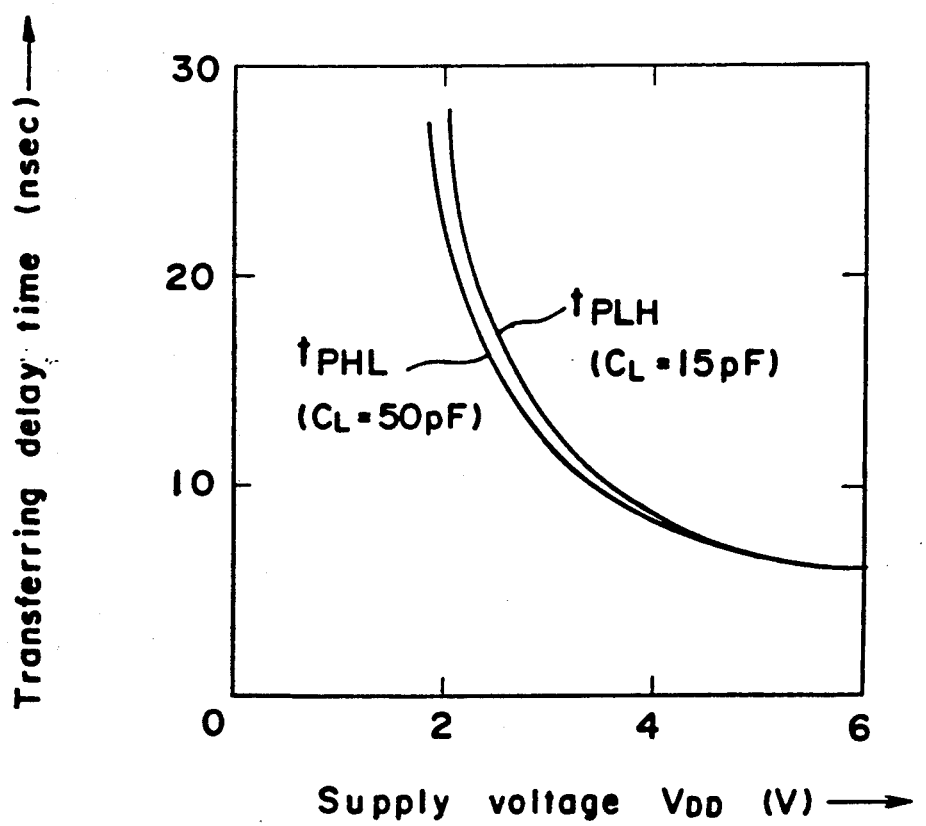
FIG. 13 is a graph showing the relationship between a supply voltage and a transferring delay time in 74HC00 type CMOS IC.

On the other hand, the transferring delay characteristic of the CMOS IC varies according to the supply voltage $V_{DD}$, generally. FIG. 13 shows the relationship between the supply voltage $V_{DD}$ (V) and the transferring delay times $t_{PHL}$ and $t_{PLH}$ (nsec) under condition of CL=50 pF and 15 pF respectively, in 74HC00 type CMOS IC. As is apparent from FIG. 13, as the supply voltage $V_{DD}$ increases, the transferring delay times $t_{PHL}$ and $t_{PLH}$ decrease. Accordingly, a suitable delay time can be set in the delay circuit DL by adjusting the supply voltage $V_{DD}$.

In the delay circuit DL shown in FIGS. 12 and 14, when 74HC00 type CMOS IC is used as the delay elements 61 to 64, the supply voltage $V_{DD}$ is adjusted to alter respective delay times of the delay elements 61 to 64 contained within the same package DLP thereof, so that a suitable delay time of the delay circuit DL can be obtained. It is to be noted that the supply voltage $V_{DD}$ is predetermined in consideration of the connection to the other devices so that a suitable delay time of the delay circuit DL can be obtained corresponding to the fθ function data stored in the ROM 51.

The fθ function correction circuit 50b shown in FIG. 14 operates as well as the Fθ function correction circuit 50a shown in FIG. 11. As described above, when the supply voltage $V_{DD}$ is adjusted so that the delay time characteristics of the delay elements 61 to 64 can be trued up, the Fθ function can be electrically corrected more precisely, except for the small errors shown in Table 4, with a lesser dependency for variations of circuit characteristics in temperature or manufactured lot.

THE FOURTH PREFERRED EMBODIMENT

A laser printer of the fourth preferred embodiment according to the present invention will be described below, referring to the attached drawings.

The scan system of the laser printer of the fourth preferred embodiment has an essentially same composition as that shown in FIG. 1. In the laser printer, the Fθ function is also corrected electrically.

Figure 16:
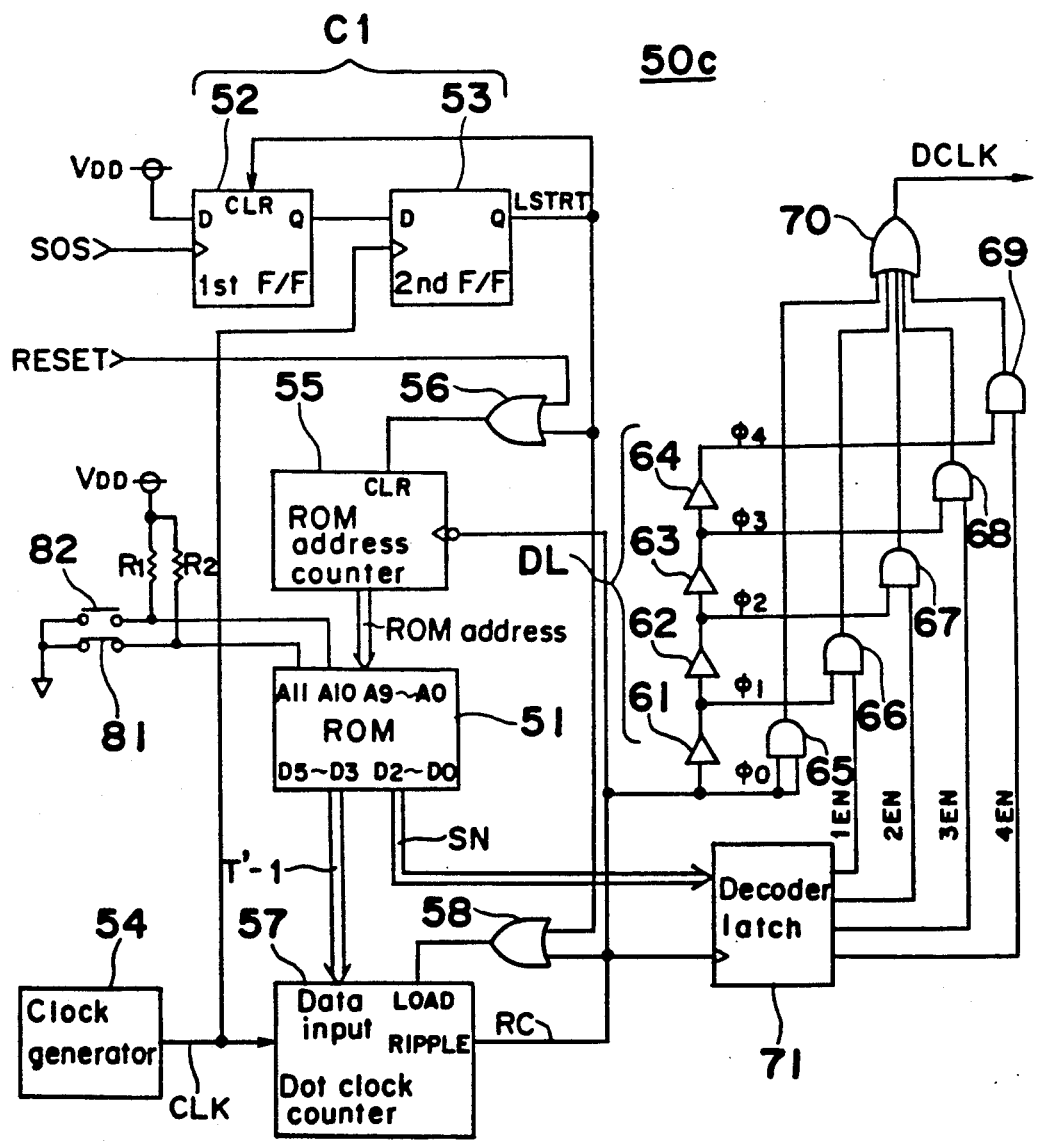
FIG. 16 is a block diagram showing an fθ function correction circuit of a laser printer of the fourth preferred embodiment according to the present invention.

FIG. 16 shows an fθ function correction circuit 50c comprised in the laser driving circuit 14 shown in FIG. 1. In FIG. 16, the same components as those shown in FIGS. 2 and 11 are designated by the same numerals as those shown in FIGS. 2 and 11. The fθ function correction circuit 50c is characterized in that four sets of Fθ function data corresponding to the division numbers for dividing the reference clock signal CLK are stored in the ROM 51 in order to set four kinds of division numbers, DIP switches 81 and 82 are connected to the higher 2 bits A11 and A10 of the address terminal of the ROM 51, and the ROM address counter 55 outputs 10 bit ROM address to the lower 10 bits A9 to A0 of the address terminal of the ROM 51, in addition to the Fθ function correction circuit 50a shown in FIG. 11.

First of all, the reason why a set of Fθ function data are selected from a plurality of sets of Fθ function data corresponding to the division numbers for dividing the reference clock signal CLK will be described hereinafter.

The precision of the delay time of the dot clock signal DCLK is dependent upon the delay time characteristic of the delay elements 61 to 64 in the delay circuit DL. For example, in the case that cheap TTL-IC is used as the delay elements, there are variations in the delay times dependent upon the manufactured lot thereof. For example, according to the specification of 74LS244 type three state buffer amplifier CMOS IC, the maximum value of the transferring delay time when the input signal changes from Low level to High level and from High level to Low level is 18 nsec, and the typical value thereof is 12 nsec, under condition of a predetermined condition. However, the minimum value thereof is not specified therein.

For example, when the fθ function data calculated under condition that the delay time of each delay element is 10 nsec are used in the Fθ function correction circuit, best precision can be obtained in the correction of the fθ function if the practical delay time thereof is 10 nsec. However, for example, when the practical delay time is 7 nsec or 13 nsec, the difference Δl between the selected scan position and the position of the nearest dot image thereto becomes approximately twice as large as that in the case of the correction with the best precision. As the difference between the calculated delay time and the practical delay time increases, the above difference Δl increases.

Accordingly, it is necessary to use a set of Fθ function data in the case of the number of the delay stages corresponding to the delay time of the delay elements used in a practical circuit.

In the present preferred embodiment, four sets of fθ function data corresponding to the division numbers 3 to 6 for dividing the reference clock signal CLK are stored at addresses from 000H to 3FFH, at addresses from 400H to 7FFH, at addresses from 800H to BFFH, and at addresses from C00H to FFFH of the ROM 51, respectively, as shown in FIG. 15. Table 11 shows the fθ function data corresponding to the division number 5 which are stored at addresses from 800H of the ROM 51, wherein the clock number data T'-1 are stored at the fifth to third bits D5 to D3 of each address thereof, and the number data SN of the delay stage are stored at the second to 0-th bits D2 to D0 thereof. It is to be noted that the above division number correspond to the aforementioned substantial clock frequency for defining the dot images. Namely, for example, when the above division number is 4, the substantial clock frequency becomes four times as high as the frequency of the clock signal CLK.

Referring to FIG. 16, the ROM address counter 55 outputs 10 bit ROM address to the lower 10 bits A9 to A0 of the address terminal of the ROM 51. The higher 2 bits A11 and A10 of the address terminal of the ROM 51 are connected to ground through the DIP switches 81 and 82, respectively, and are also connected to a voltage source $V_{DD}$ through pull-up resisters $R_1$ and $R_2$, respectively. Accordingly, when respective DIP switches 81 and 82 are turned on or off, High or Low level signals are input to the higher 2 bits A11 and A10 of the address terminal of the ROM 51, in a known manner.

In the Fθ function correction circuit 50c as constructed above, when the higher 2 bits A11 and A10 of the address of the ROM 51 are set to predetermined levels by using the DIP switches 81 and 82, a suitable set of fθ function data for the delay time of the delay elements 61 to 64 arranged in a practical circuit can be selected. The fb function correction circuit 50c operates as well as the fθ function correction circuit 50a of the second preferred embodiment, except for the aforementioned selection of four sets of fθ function data.

Accordingly, in the laser printer of the present preferred embodiment, since a suitable set of Fθ function data for the delay time of the delay elements 61 to 64 can be selected, the Fθ function can be electrically corrected by the Fθ function correction circuit 50c, more precisely, than the conventional laser printer.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

TABLE 1

| Address | IA Signal D4 | Clock Number Data D3 | D2 | D1 | D0 |
|---|---|---|---|---|---|
| 0 | 0 | 0 | 1 | 0 | 1 |
| 1 | 0 | 0 | 1 | 0 | 1 |
| 2 | 0 | 0 | 1 | 1 | 0 |
| 3 | 0 | 0 | 1 | 1 | 0 |
| 4 | 1 | 0 | 1 | 1 | 1 |
| 5 | 1 | 0 | 1 | 1 | 1 |
| 6 | 1 | 1 | 0 | 0 | 0 |
| 7 | 1 | 1 | 0 | 0 | 0 |
| 8 | 1 | 1 | 0 | 0 | 1 |
| 9 | 1 | 1 | 0 | 0 | 1 |
| 10 | 1 | 1 | 0 | 1 | 0 |
| 11 | 1 | 1 | 0 | 1 | 0 |
| 12 | 1 | 1 | 0 | 1 | 0 |
| 13 | 1 | 1 | 0 | 1 | 0 |
| 14 | 1 | 1 | 0 | 1 | 0 |
| 15 | 1 | 1 | 0 | 0 | 1 |
| 16 | 1 | 1 | 0 | 0 | 1 |
| 17 | 1 | 1 | 0 | 0 | 0 |
| 18 | 0 | 1 | 0 | 0 | 0 |
| 19 | 0 | 0 | 1 | 1 | 1 |
| 20 | 0 | 0 | 1 | 1 | 1 |
| 21 | 0 | 0 | 1 | 1 | 0 |
| 22 | 0 | 0 | 1 | 1 | 0 |
| 23 | 0 | 0 | 1 | 0 | 1 |
| 24 | 0 | 0 | 1 | 0 | 1 |

TABLE 2

| T | l (μm) | Position of Dot Image |
|---|---|---|
| 1 | 15.71 | |
| 2 | 31.41 | |
| 3 | 47.12 | |
| 4 | 62.83 | |
| 5 | 78.54 | |
| | | 84.7 (First Dot Image) |
| 6 | 94.25 | |
| 7 | 109.96 | |
| 8 | 125.66 | |
| 9 | 141.37 | |
| 10 | 157.08 | |
| | | 169.3 (Second Dot Image) |
| 11 | 172.79 | |
| 12 | 188.50 | |
| 13 | 204.20 | |
| 14 | 219.91 | |
| 15 | 235.62 | |
| 16 | 251.33 | |
| | | 254.0 (Third Dot Image) |
| 17 | 267.04 | |
| ... | ... | |
| ... | ... | |
| ... | ... | |

TABLE 3

| N | T | l (μm) | Δl (μm) |
|---|---|---|---|
| 1 | 5 | 78.54 | 6.13 |
| 2 | 10 | 157.08 | 12.25 |
| 3 | 16 | 251.33 | 2.67 |
| 4 | 21 | 329.87 | 8.80 |
| 5 | 26 | 408.41 | 14.93 |
| 6 | 32 | 502.66 | 5.34 |
| 7 | 37 | 581.20 | 11.47 |
| 8 | 43 | 675.44 | 1.89 |
| 9 | 48 | 753.98 | 8.02 |
| 10 | 53 | 832.52 | 14.14 |
| 11 | 59 | 926.77 | 4.56 |
| 12 | 64 | 1005.31 | 10.69 |
| 13 | 70 | 1099.56 | 1.10 |
| 14 | 75 | 1178.10 | 7.23 |
| ... | ... | ... | ... |
| ... | ... | ... | ... |
| ... | ... | ... | ... |

TABLE 4

| N | T | T' | SN | Δl (μm) | Δl/84.7 (%) |
|---|---|---|---|---|---|
| 1 | 5 | 5 | 1 | 2.99 | 3.33 |
| 2 | 10 | 5 | 3 | 2.83 | 3.34 |
| 3 | 16 | 6 | 0 | 2.67 | 3.16 |
| 4 | 21 | 5 | 2 | 2.52 | 2.97 |
| 5 | 26 | 5 | 4 | 2.36 | 2.79 |
| 6 | 32 | 6 | 1 | 2.20 | 2.60 |
| 7 | 37 | 5 | 3 | 2.05 | 2.42 |
| 8 | 43 | 6 | 0 | 1.89 | 2.23 |
| 9 | 48 | 5 | 2 | 1.73 | 2.05 |
| 10 | 53 | 5 | 4 | 1.58 | 1.86 |
| 11 | 59 | 6 | 1 | 1.42 | 1.68 |
| 12 | 64 | 5 | 3 | 1.26 | 1.49 |
| 13 | 70 | 6 | 0 | 1.10 | 1.30 |
| 14 | 75 | 5 | 2 | 0.95 | 1.12 |
| 15 | 80 | 5 | 4 | 0.79 | 0.93 |
| 16 | 86 | 6 | 1 | 0.63 | 0.75 |
| 17 | 91 | 5 | 3 | 0.47 | 0.56 |
| 18 | 97 | 6 | 0 | 0.31 | 0.37 |
| 19 | 102 | 5 | 2 | 0.16 | 0.18 |
| 20 | 107 | 5 | 3 | 3.14 | 3.71 |
| 21 | 113 | 6 | 0 | 2.98 | 3.52 |
| 22 | 118 | 5 | 2 | 2.82 | 3.33 |
| 23 | 123 | 5 | 4 | 2.66 | 3.14 |
| 24 | 129 | 6 | 1 | 2.50 | 2.95 |
| 25 | 134 | 5 | 3 | 2.34 | 2.76 |
| 26 | 140 | 6 | 0 | 2.18 | 2.57 |
| 27 | 145 | 5 | 2 | 2.02 | 2.38 |
| 28 | 150 | 5 | 4 | 1.81 | 2.19 |
| 29 | 156 | 6 | 1 | 1.69 | 2.00 |
| 30 | 161 | 5 | 3 | 1.53 | 1.81 |
| ... | ... | ... | ... | ... | ... |
| ... | ... | ... | ... | ... | ... |
| ... | ... | ... | ... | ... | ... |

TABLE 5

| Address | Clock Number T'-1 D5 | D4 | D3 | Number of Delay Stages SN D2 | D1 | D0 |
|---|---|---|---|---|---|---|
| 0 | 1 | 0 | 0 | X | X | X |
| 1 | 1 | 0 | 0 | 0 | 0 | 1 |
| 2 | 1 | 0 | 1 | 0 | 1 | 1 |
| 3 | 1 | 0 | 0 | 0 | 0 | 0 |
| 4 | 1 | 0 | 0 | 0 | 1 | 0 |
| 5 | 1 | 0 | 1 | 1 | 0 | 0 |
| 6 | 1 | 0 | 1 | 0 | 0 | 1 |
| 7 | 1 | 0 | 1 | 0 | 1 | 1 |
| 8 | 1 | 0 | 0 | 0 | 0 | 0 |
| ... | ... | ... | ... | ... | ... | ... |
| ... | ... | ... | ... | ... | ... | ... |
| ... | ... | ... | ... | ... | ... | ... |

TABLE 6

| N | T (N) | T' (N) | Dot Interval (μm) | Δl (μm) |
|---|---|---|---|---|
| 1 | 5 | 5 | 78.53 | 6.13 |
| 2 | 11 | 6 | 94.24 | −3.45 |
| 3 | 16 | 5 | 78.53 | 2.67 |
| 4 | 22 | 6 | 94.24 | −6.91 |
| 5 | 27 | 5 | 78.53 | −0.78 |
| 6 | 32 | 5 | 78.54 | 5.34 |
| 7 | 38 | 6 | 94.24 | −4.24 |
| 8 | 43 | 5 | 78.54 | 1.89 |
| 9 | 49 | 6 | 94.24 | −7.69 |
| 10 | 54 | 5 | 78.54 | −1.57 |
| 11 | 59 | 5 | 78.54 | 4.56 |
| 12 | 65 | 6 | 94.24 | −5.02 |
| 13 | 70 | 5 | 78.54 | 1.10 |
| 14 | 75 | 5 | 78.54 | 7.23 |
| 15 | 81 | 6 | 94.24 | −2.35 |
| ... | ... | ... | ... | ... |
| ... | ... | ... | ... | ... |
| ... | ... | ... | ... | ... |

TABLE 7

| N | T (N) | T (N)-T (N-1) | SN (N) | Dot Interval (μm) | Δl (μm) |
|---|---|---|---|---|---|
| 1 | 5 | 5 | 2 | 84.82 | −0.16 |
| 2 | 10 | 5 | 4 | 84.82 | −0.31 |
| 3 | 16 | 6 | 1 | 84.82 | −0.47 |
| 4 | 21 | 5 | 3 | 84.82 | −0.63 |
| 5 | 26 | 5 | 5 | 84.82 | −0.78 |
| 6 | 32 | 6 | 2 | 84.82 | −0.94 |
| 7 | 37 | 5 | 4 | 84.82 | −1.09 |
| 8 | 43 | 6 | 1 | 84.82 | −1.26 |
| 9 | 48 | 5 | 3 | 84.82 | −1.41 |
| 10 | 53 | 5 | 5 | 84.82 | −1.57 |
| 11 | 59 | 6 | 1 | 84.82 | 1.42 |
| 12 | 64 | 5 | 3 | 84.82 | 1.27 |
| 13 | 70 | 6 | 0 | 84.82 | 1.10 |
| 14 | 75 | 5 | 2 | 84.82 | 0.95 |
| 15 | 80 | 5 | 4 | 84.82 | 0.79 |
| 16 | 86 | 6 | 1 | 84.82 | 0.63 |
| 17 | 91 | 5 | 3 | 84.82 | 0.48 |
| 18 | 97 | 6 | 0 | 84.82 | 0.31 |
| 19 | 102 | 5 | 2 | 84.82 | 0.16 |
| 20 | 107 | 5 | 4 | 84.82 | −0.00 |
| 21 | 113 | 6 | 1 | 84.82 | −0.16 |
| 22 | 118 | 5 | 3 | 84.82 | −0.33 |
| 23 | 123 | 5 | 5 | 84.82 | −0.49 |
| 24 | 129 | 6 | 2 | 84.82 | −0.65 |
| 25 | 134 | 5 | 4 | 84.82 | −0.80 |
| 26 | 140 | 6 | 1 | 84.82 | −0.97 |
| 27 | 145 | 5 | 3 | 84.82 | −1.12 |
| 28 | 150 | 5 | 5 | 84.82 | −1.28 |
| 29 | 156 | 6 | 2 | 84.82 | −1.44 |
| 30 | 161 | 5 | 3 | 81.68 | 1.53 |
| ... | ... | ... | ... | ... | ... |

TABLE 8

| N | T (N) | T (N)-T (N-1) | SN (N) | Dot Interval (μm) | Δl (μm) |
|---|---|---|---|---|---|
| 1 | 5 | 5 | 3 | 85.13 | −0.47 |
| 2 | 10 | 5 | 6 | 85.13 | −0.97 |
| 3 | 16 | 6 | 1 | 83.25 | 0.47 |
| 4 | 21 | 5 | 4 | 85.13 | 0.00 |
| 5 | 26 | 5 | 7 | 85.13 | −0.47 |
| 6 | 32 | 6 | 2 | 83.25 | 0.95 |
| 7 | 37 | 5 | 5 | 85.13 | 0.48 |
| 8 | 43 | 6 | 1 | 85.45 | −0.31 |
| 9 | 48 | 5 | 4 | 85.13 | −0.78 |
| 10 | 53 | 5 | 5 | 82.93 | 0.95 |
| 11 | 59 | 6 | 2 | 85.45 | 0.16 |
| 12 | 64 | 5 | 5 | 85.13 | −0.31 |
| 13 | 70 | 6 | 1 | 85.45 | −1.09 |
| 14 | 75 | 5 | 3 | 82.93 | 0.63 |
| 15 | 80 | 5 | 6 | 85.13 | 0.16 |
| 16 | 86 | 6 | 2 | 85.45 | −0.63 |
| 17 | 91 | 5 | 5 | 88.13 | −1.10 |
| 18 | 97 | 6 | 0 | 83.25 | 0.31 |
| 19 | 102 | 5 | 3 | 85.13 | −0.16 |
| 20 | 107 | 5 | 6 | 85.13 | −0.63 |
| 21 | 113 | 6 | 1 | 83.25 | 0.78 |
| 22 | 118 | 5 | 4 | 85.14 | 0.31 |
| 23 | 123 | 5 | 7 | 85.14 | −0.17 |
| 24 | 129 | 6 | 3 | 85.45 | −0.96 |
| 25 | 134 | 5 | 5 | 82.94 | 0.77 |
| 26 | 140 | 6 | 1 | 85.45 | −0.02 |
| 27 | 145 | 5 | 4 | 85.14 | −0.50 |
| 28 | 150 | 5 | 7 | 85.14 | −0.97 |
| 29 | 156 | 6 | 2 | 83.25 | 0.44 |
| 30 | 161 | 5 | 5 | 85.14 | −0.04 |
| ... | ... | ... | ... | ... | ... |

TABLE 9

| N | T (N) | T (N)-T (N-1) | SN (N) | Dot Interval (μm) | Δl (μm) |
|---|---|---|---|---|---|
| 1 | 5 | 5 | 2 | 86.70 | −2.04 |
| 2 | 10 | 5 | 3 | 82.62 | 0.00 |
| 3 | 16 | 6 | 1 | 86.07 | −1.41 |
| 4 | 21 | 5 | 2 | 82.62 | 0.63 |
| 5 | 26 | 5 | 4 | 86.70 | −1.41 |
| 6 | 32 | 6 | 1 | 81.99 | 1.26 |
| 7 | 37 | 5 | 3 | 86.70 | −0.78 |
| 8 | 43 | 6 | 0 | 81.99 | 1.89 |
| 9 | 48 | 5 | 2 | 86.70 | −0.15 |
| 10 | 53 | 5 | 3 | 82.62 | 1.89 |
| 11 | 59 | 6 | 1 | 86.08 | 0.48 |
| 12 | 64 | 5 | 3 | 86.70 | −1.57 |
| 13 | 70 | 6 | 0 | 81.99 | 1.10 |
| 14 | 75 | 5 | 2 | 86.70 | −0.94 |
| 15 | 80 | 5 | 3 | 82.62 | 1.10 |
| 16 | 86 | 6 | 1 | 86.08 | −0.31 |
| 17 | 91 | 5 | 2 | 82.62 | 1.73 |
| 18 | 97 | 6 | 0 | 86.08 | 0.31 |
| 19 | 102 | 5 | 2 | 86.71 | −1.73 |
| 20 | 107 | 5 | 3 | 82.62 | 0.31 |
| 21 | 113 | 6 | 1 | 86.08 | −1.11 |
| 22 | 118 | 5 | 2 | 82.62 | 0.93 |
| 23 | 123 | 5 | 4 | 86.71 | −1.11 |
| 24 | 129 | 6 | 1 | 81.99 | 1.56 |
| 25 | 134 | 5 | 3 | 86.71 | −0.49 |
| 26 | 140 | 6 | 1 | 86.08 | −1.91 |
| 27 | 145 | 5 | 2 | 82.62 | 0.13 |
| 28 | 150 | 5 | 4 | 86.71 | −1.91 |
| 29 | 156 | 6 | 1 | 82.00 | 0.75 |
| 30 | 161 | 5 | 3 | 86.71 | −1.30 |
| ... | ... | ... | ... | ... | ... |

TABLE 10

| Item | Condition | | Min. | Typ. | Max. | Unit |
|---|---|---|---|---|---|---|
| Transferring delay time | $t_{PLH}$ | $C_L = 15pF$ | — | 8 | 15 | nsec |
| | $t_{PHL}$ | $C_L = 50pF$ | — | 10 | 17 | nsec |
| Rise-up time and Breaking time | $t_{TLH}$ | $C_L = 15pF$ | — | 4 | 8 | nsec |
| | $t_{THL}$ | $C_L = 50pF$ | — | 6 | 12 | nsec |
| Input capacitance | Ci | | — | 5 | 10 | pF |

TABLE 11

| Address | Clock Number T'-1 | | | Number of Delay Stages SN | | |
|---|---|---|---|---|---|---|
| | D5 | D4 | D3 | D2 | D1 | D0 |
| 800H | 1 | 0 | 0 | X | X | X |
| 801H | 1 | 0 | 0 | 0 | 0 | 1 |
| 802H | 1 | 0 | 1 | 0 | 1 | 1 |
| 803H | 1 | 0 | 0 | 0 | 0 | 0 |
| 804H | 1 | 0 | 0 | 0 | 1 | 0 |
| 805H | 1 | 0 | 1 | 1 | 0 | 0 |
| 806H | 1 | 0 | 1 | 0 | 0 | 1 |
| 807H | 1 | 0 | 1 | 0 | 1 | 1 |
| 808H | 1 | 0 | 0 | 0 | 0 | 0 |
| ... | ... | ... | ... | ... | ... | ... |

What is claimed is:

1. A beam scan type recording apparatus for deflecting and scanning using a deflecting means a laser beam emitted from a laser source periodically at each occurrence of a timing pulse signal so as to form an image on a photosensitive medium for recording a visible image comprised of dot images, comprising:
a clock generator for generating a reference clock signal having a predetermined frequency;
an address counter for altering the counting value by one in accordance with a dot clock signal outputted at a timing for recording one dot image so as to output the counting value as address data;

a memory means for changing a time interval between adjacent occurrences of said timing pulse signal by storing numerical data representing time interval between emission timings of the laser beam corresponding to respective dot images at each address corresponding thereto so as to output the numerical data stored at the address corresponding to the address data input from said address counter, said numerical data corresponding to at least a center portion of said photoconductive medium in a direction of scan of the laser beam being different from said numerical data corresponding to end portions of said photoconductive medium in the direction of the scan of the laser beam;

a dot clock counter being set the numerical data outputted from said memory means as a preset value in response to a load signal, counting the value by one in accordance with the reference clock signal outputted from said clock generator, and outputting said timing pulse signal when the counting value agrees with the present value, said timing pulse signal being returned to said dot clock counter as the load signal and being supplied to said address counter to rest it; and a driving means for driving said laser means according to image data in synchronous with said timing pulse signal outputted from said dot clock counter;

whereby the scan of the laser beam is ensured at a predetermined speed without an optical correction means.

2. The beam scan type recording apparatus as claimed in claim 1, further comprising:

a delay circuitry arranged between said dot clock counter and said driving means, said delay circuitry comprising a plurality of stages of delay elements connected in series, each delay element having a predetermined delay time shorter than the period of the reference clock signal, each delay element for delaying the timing pulse signal outputted from said dot clock counter so as to output delayed timing pulse signals having different delay times; and a selection means for selecting the delayed timing pulse signals outputted from respective delay elements so as to output the selected timing pulse signal to said driving means.

3. The beam scan type recording apparatus as claimed in claim 2, wherein said memory further stores delay stage data to be used with a numerical data at each address so as to output the delay stage data to said selection means.

4. The beam scan type recording apparatus as claimed in claim 2, wherein said memory means stores a plurality of sets of data, each set of data comprising the numerical data and delay stage data which are different from the delay stage data of the other sets of data at each address; and said beam scan type recording apparatus further comprising:

a setting means for setting a set of data to be used.

5. The beam scan type recording apparatus as claimed in claim 4, wherein said memory means stores a plurality of sets of data sequentially at a plurality of corresponding sets of addresses having different higher bits, respectively;

said setting means outputs the higher bits of address corresponding to a set of data to be used to said memory means; and said address counter outputs the other lower bits of address.

6. The beam scan type recording apparatus as claimed in claim 2, wherein said delay elements are constituted by a CMOS device.

7. The beam scan type recording apparatus as claimed in claim 6, further comprising:

a variable voltage source for supplying a variable direct-current voltage to said CMOS device so as to adjust the delay time of said each delay element.

* * * * *